US012702244B2

(12) United States Patent
Zhang

(10) Patent No.: US 12,702,244 B2
(45) Date of Patent: Aug. 11, 2026

(54) MOVABLE COPYING DECORATION

(71) Applicant: Fan Zhang, Zhejiang (CN)

(72) Inventor: Fan Zhang, Zhejiang (CN)

( * ) Notice: Subject to any disclaimer, the term of this patent is extended or adjusted under 35 U.S.C. 154(b) by 69 days.

(21) Appl. No.: 18/799,855

(22) Filed: Aug. 9, 2024

(65) Prior Publication Data

US 2026/0041266 A1 Feb. 12, 2026

(51) Int. Cl.

| | |
|---|---|
| ***A47G 33/00*** | (2006.01) |
| ***F21V 33/00*** | (2006.01) |
| ***G09F 19/08*** | (2006.01) |
| *F21W 121/00* | (2006.01) |

(52) U.S. Cl.
CPC .......... *A47G 33/00* (2013.01); *F21V 33/0028* (2013.01); *G09F 19/08* (2013.01); *F21W 2121/00* (2013.01)

(58) Field of Classification Search
CPC .. F21V 33/0028; G09F 19/08; F21W 2121/00
See application file for complete search history.

(56) References Cited

U.S. PATENT DOCUMENTS

| | | | | |
|---|---|---|---|---|
| 6,413,594 | B1 * | 7/2002 | Onishi | G09F 19/08 428/7 |
| 6,478,164 | B1 * | 11/2002 | Pan | G09F 19/02 211/1.51 |
| 6,758,001 | B1 * | 7/2004 | Su | G09F 19/08 40/538 |
| 2005/0047119 | A1 * | 3/2005 | Fan | G09F 19/08 362/124 |
| 2006/0218827 | A1 * | 10/2006 | Wang | G09F 19/08 40/414 |
| 2007/0006495 | A1 * | 1/2007 | Liu | G09F 19/08 40/414 |
| 2011/0007507 | A1 * | 1/2011 | Braasch | G09F 15/0062 362/249.14 |
| 2011/0151147 | A1 * | 6/2011 | Kinderman | G09F 19/08 428/16 |
| 2024/0353075 | A1 * | 10/2024 | Lin | F21V 23/06 |

* cited by examiner

*Primary Examiner* — Gary C Hoge
(74) *Attorney, Agent, or Firm* — Hawaii Patent Services; Nathaniel K. Fedde; Kenton N. Fedde

(57) ABSTRACT

A movable copying decoration comprises a decoration body and at least one driving component, wherein the decoration body comprises at least one movable body and at least one fixed body, and the movable body is rotatably engaged with the fixed body; wherein, the movable body has a movable end, and the movable body is rotatably connected to the fixed body through the movable end; wherein, the movable end comprises at least one movable body outer ring, and the fixed body comprises at least one joint part.

18 Claims, 28 Drawing Sheets

MOVABLE COPYING DECORATION

TECHNICAL FIELD

The present invention relates to the technical field of decorations, in particular to a movable copying decoration.

BACKGROUND

With the progress of the times, while lighting is convenient enough, people are not satisfied with the traditional lighting function at first, and the use of lights to decorate the environment is becoming more and more common. Among them, copying decorative lamps have attracted more and more attention in the market. Most of the common copying decorative lamps are made up of light bulbs, tubes or various decorations. Although they are luxurious, they have no three-dimensional modeling, lack of realism and lack of appreciation value, which needs to be improved.

U.S. Pat. No. 7,789,521 discloses a decorative lamp, which comprises a support frame, wherein a luminous body is fixed inside the support frame, and the outside of the support frame is covered with a layer of colored gauze film, and the support frame as a whole presents the appearance of an animal, thus achieving a decorative effect. However, this decorative lamp cannot move, and its image lacks vitality and is not real enough.

Based on the above problems, the present invention provides a brand-new copying decorative lamp, which can move while illuminating, thus enhancing the interaction with viewers, being more realistic and having higher artistic value.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a movable copying decoration to solve the problems that the existing decorative products cannot move, and the image is lifeless and unreal.

In order to achieve the above object, the present invention adopts the following technical solutions:

a movable copying decoration includes a decoration body and at least one driving component, wherein, the decoration body includes at least one movable body and at least one fixed body, and the movable body is rotatably engaged with the fixed body; and wherein, the movable body has a movable end, and the movable body is rotatably connected to the fixed body through the movable end; and wherein, that movable end include at least one movable body outer ring; the fixed body includes at least one joint part, at least one ring frame is arrange on the joint part, and the ring frame includes at least one joint part outer ring; and the driving component includes at least one transmission mechanism, and the transmission mechanism includes at least one rotating rod; one end of the rotating rod sequentially passes through the joint part outer ring and the movable body outer ring, and is used for pushing the movable body outer ring to rotate.

The present invention further provides a movable copying decoration, which includes a decoration body and at least one driving component, wherein, the decoration body includes at least one movable body and at least one fixed body, and the movable body is rotatably engaged with the fixed body; and wherein, the movable body has a movable end, and the movable body is rotatably connected to the fixed body through the movable end; and the decoration body is provided with an illuminating module, which includes a light source and a power supply, and is detachably connected to the decoration body.

BRIEF DESCRIPTION OF DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
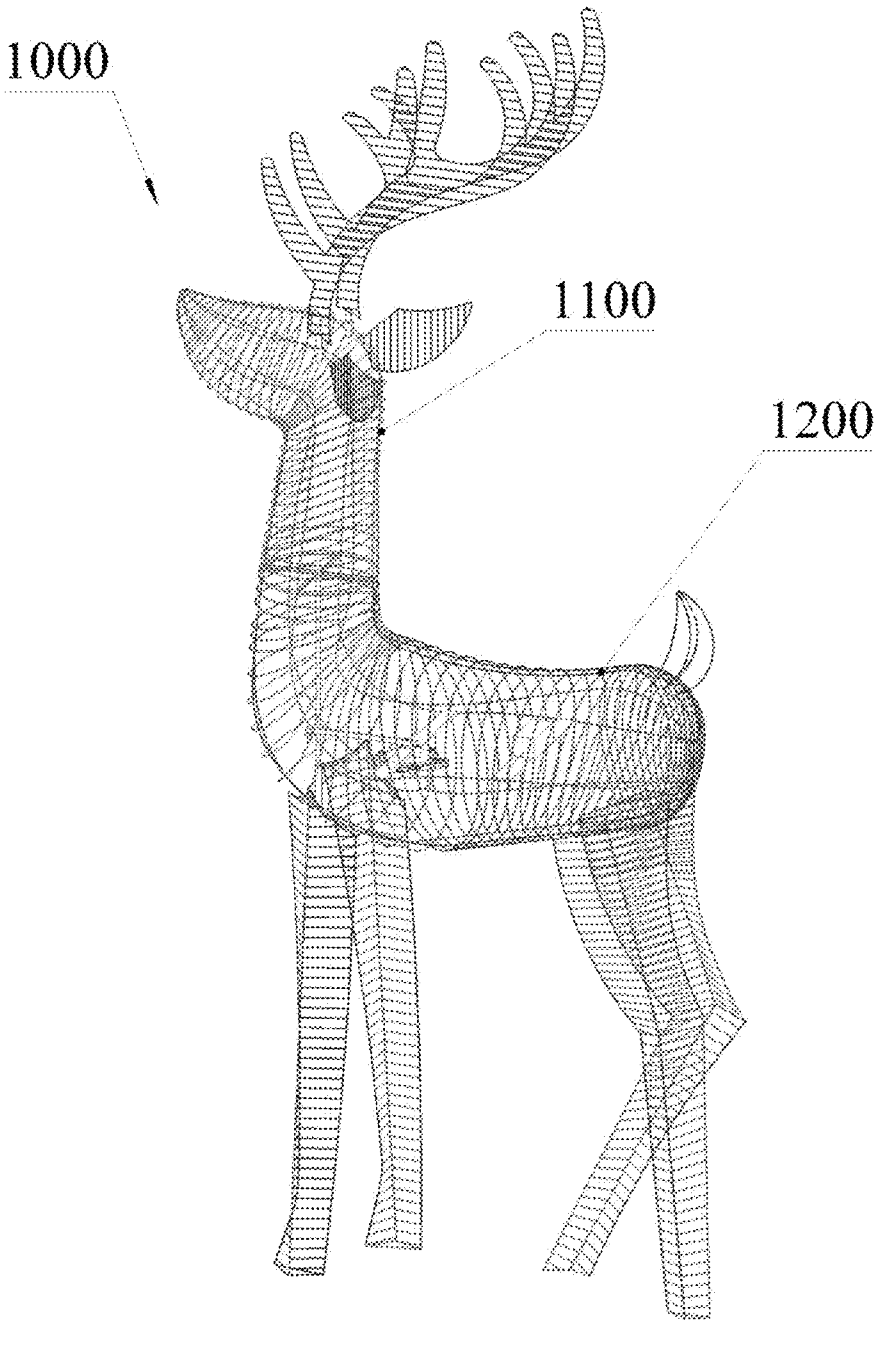
FIG. 1 is a schematic view of a decoration body of the present invention.

Reference signs: Decoration body (1000); Tail (1001); Ear (1002); Antler (1003); Movable body (1100); Fixed body (1200); Movable end (1300); Trunk part (1400); Leg (1500); Illuminating module (1600); Light source (1610); Power supply (1620); Joint part (1210); Ring frame (1220); Central hole (1230); Lower spoke (1240); Joint part outer ring (1250); Inner end (1241); Outer end (1242); Central hub (1310); Upper spoke (1320); Movable body outer ring (1330); One end (1321); The other end (1322); Central axis (1340); Diving component (2000); Motor (2100); Transmission mechanism (2200); Motor shaft (2110); Outer shell (2120); Inner shell (2130); Power supply interface (2121); Cylindrical step (2111); Driving element (2300); Transmission rod (2400); Hole end (2410); Protruding end (2420); Protrusion (2421); Connecting element (2500); Rotating rod (2600); Rotating base (2700); Fixed plate (2800); Fixed disk (2900); Fixed part (2310); Connecting part (2320); PCB board (2131); Threaded groove (2132); Upper end (2610); Lower end (2620); Through hole (2810); Connecting hole (2910); Hole seat (2920).

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Referring to FIG. 1, a movable copying decoration provided by the present invention includes a decoration body 1000, which has an animal shape and is made of a hard material, such as metal or hard plastic, wherein the metal material is preferably iron, stainless steel, etc., and the hard plastic is preferably nylon and polystyrene. By selecting metal materials, the copying decoration can be more durable. By selecting hard plastic materials, the weight of copying decoration can be reduced, and the copying decoration is easier to process and manufacture.

Figure 2:
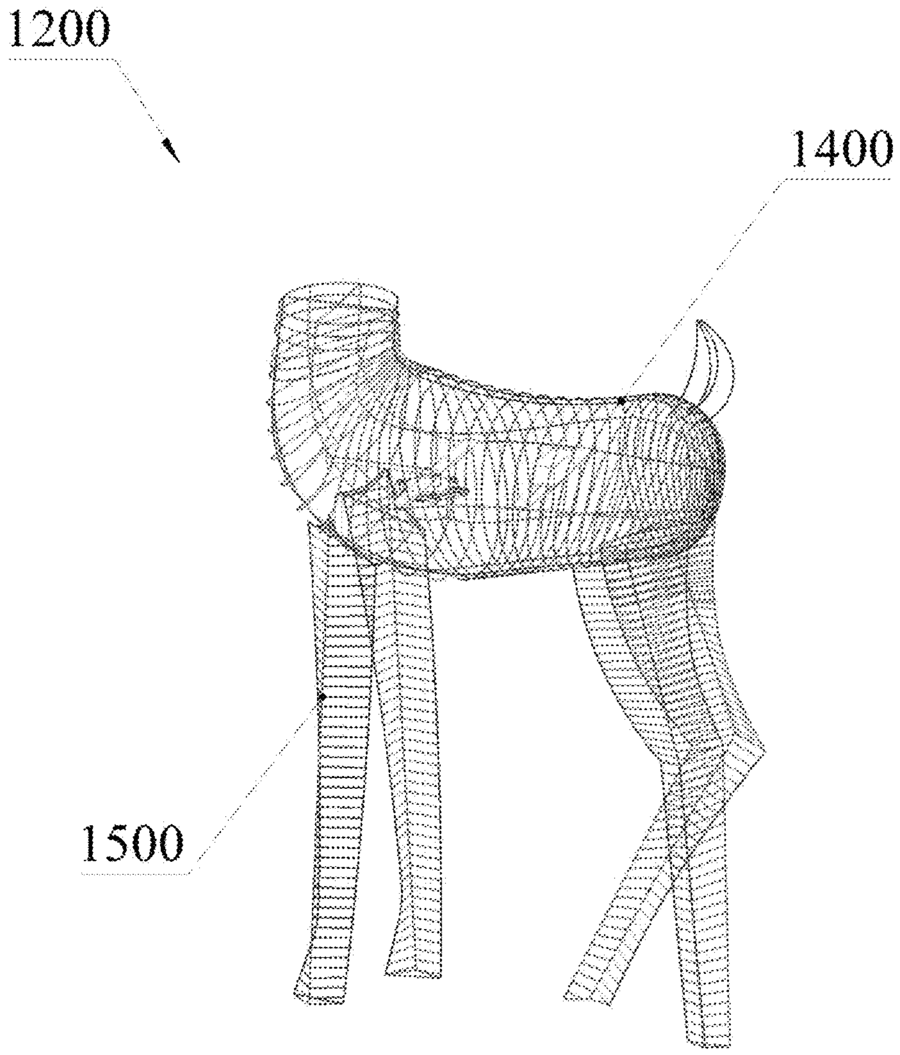
FIG. 2 is a schematic view of the fixed body of the present invention.
Figure 3:
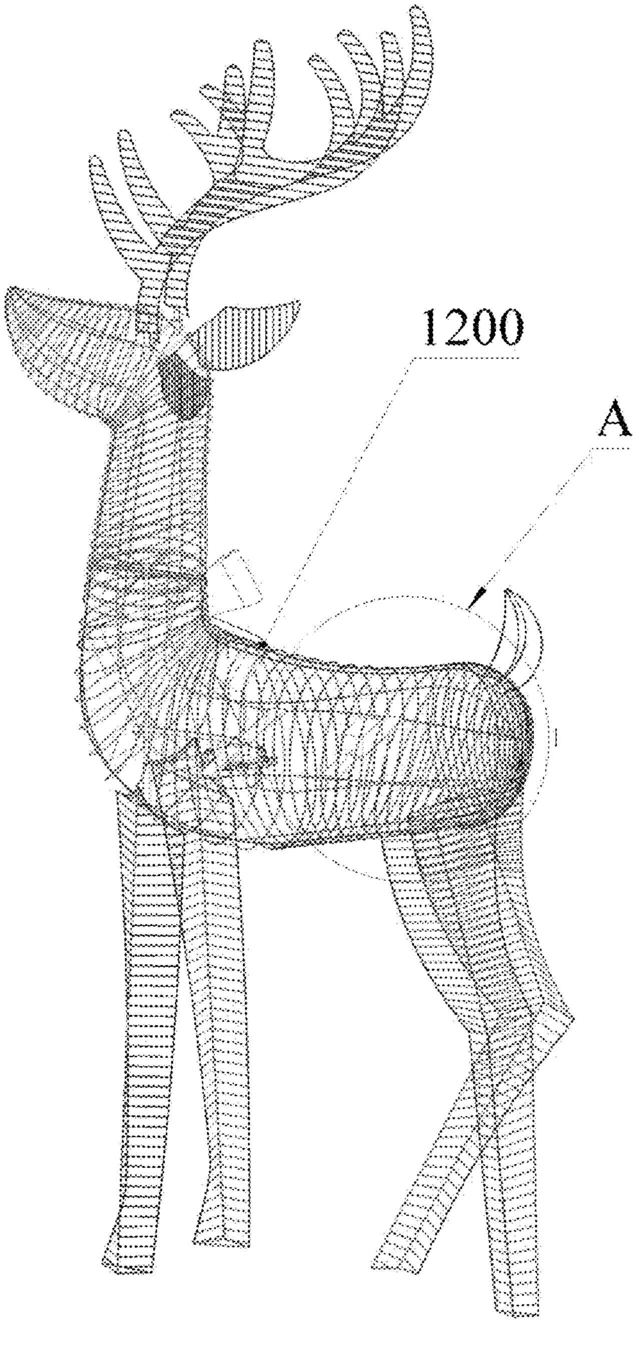
FIG. 3 is a schematic diagram of the position of the illuminating module of the present invention.
Figure 4:
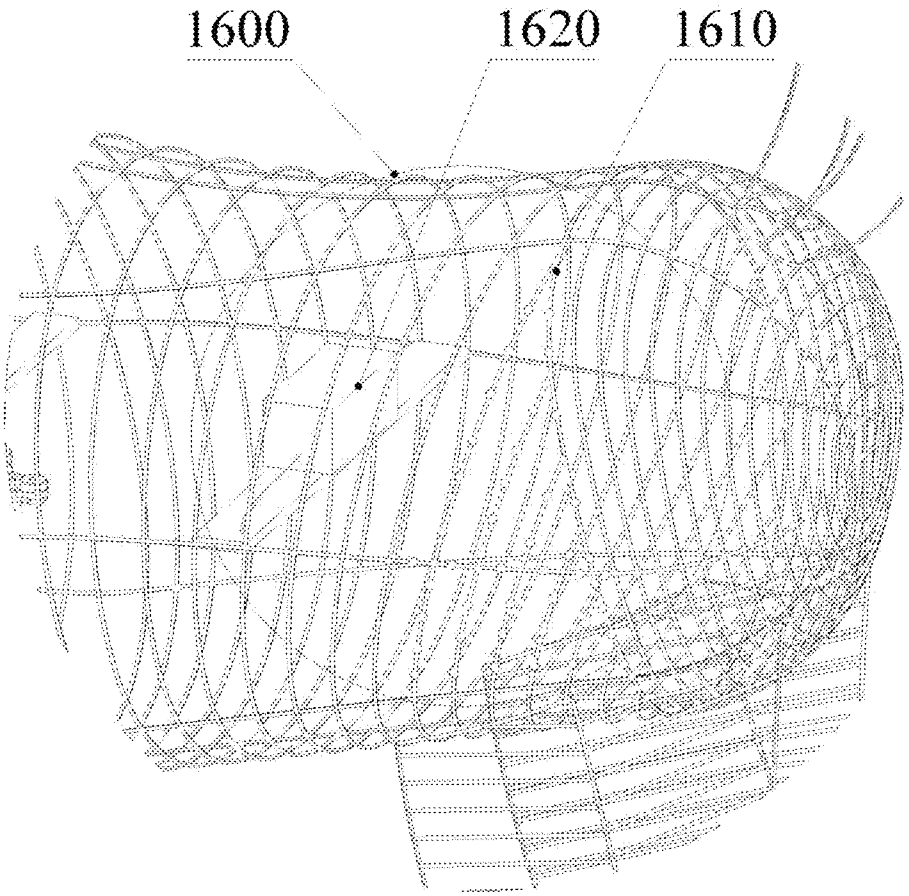
FIG. 4 is a partially enlarged schematic view at A in FIG. 3.

In this embodiment, the decoration body 1000 is set to have the appearance of a deer, including a movable body 1100 with a head shape and a fixed body 1200 with a trunk shape and rotatably engaged with the movable body 1100, wherein (see FIG. 2), the fixed body 1200 includes a trunk part 1400 and legs 1500, and the legs 1500 have four legs, and the legs 1500 are fixedly connected to the trunk part 1400, so that the movable copying decoration can stand stably, and can be stored as a static handicraft when the movable copying decoration is not working, and has strong artistic value.

In other possible embodiments (not shown), the movable copying decoration can also have the shape of a lion, a tiger, a monkey, a giant panda, an elephant, a hippo, a kangaroo, a cheetah, a giraffe, a rhinoceros, a horse, a penguin, a polar bear and other animals. In addition to the above animal shapes, it can also be the image of spiders, mantis, ants and other insects. Of course, it can also be used for aquatic animals such as crabs, lobsters, sharks and whales. Of course, it may also include pet images such as cats, dogs and rabbits. In addition, it can also be the image of birds such as sparrows, eagles and pigeons. Besides the above animal images, it can also be humanoid images such as Santa Claus, witch, superman, angel, devil, skeleton, ghost, snowman and soldier. Of course, it can also be non-biological images such as candles, lighthouses, sledges and snowmen.

Moreover, according to the above image, the movable body 1100 is not limited to the head movement, but can also set corresponding movable parts according to the corresponding image, such as legs, arms, wings, tails and other parts suitable for movement.

For example:

When the imitation decoration is a humanoid image such as Santa Claus, snowman or angel, the movable body 1100 can be set as an arm, and the arm can wave. And the snowman can also be set to hold the broom and shake it left and right (not shown).

Figure 22:
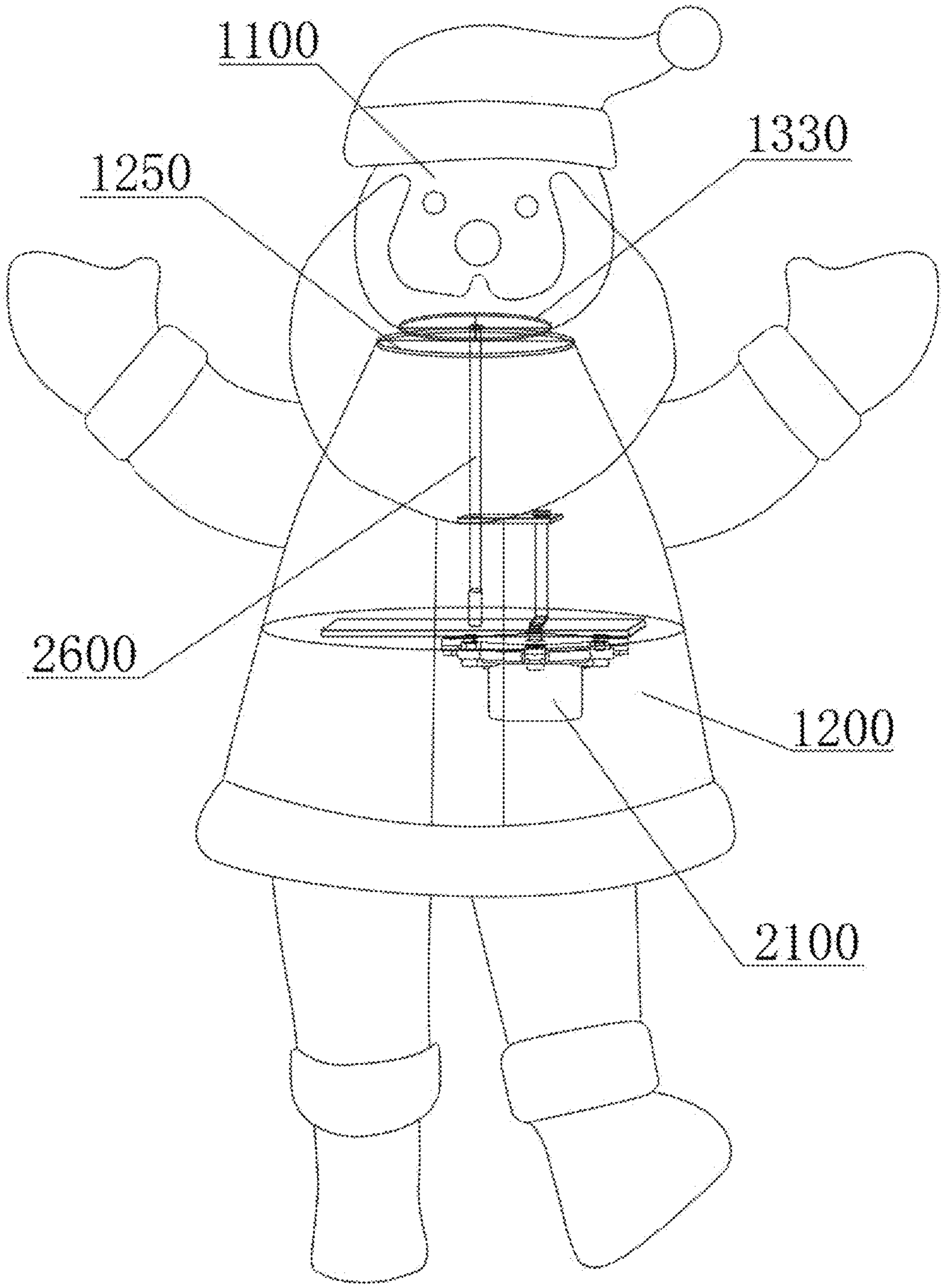
FIG. 22 is a schematic diagram of the second embodiment of the decoration body of the present invention.
Figure 23:
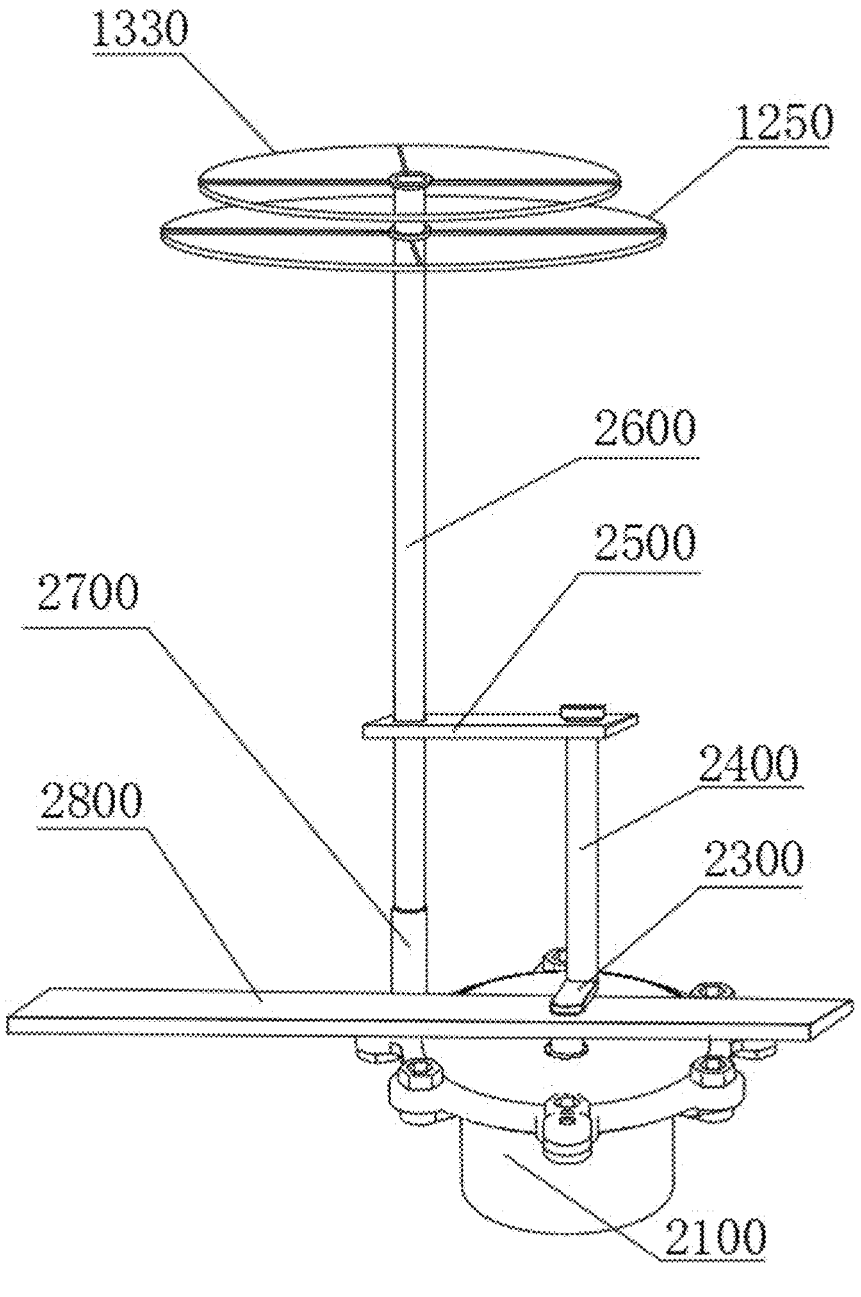
FIG. 23 is a schematic structural view of the driving component of the second embodiment of the decoration body of the present invention.
Figure 24:
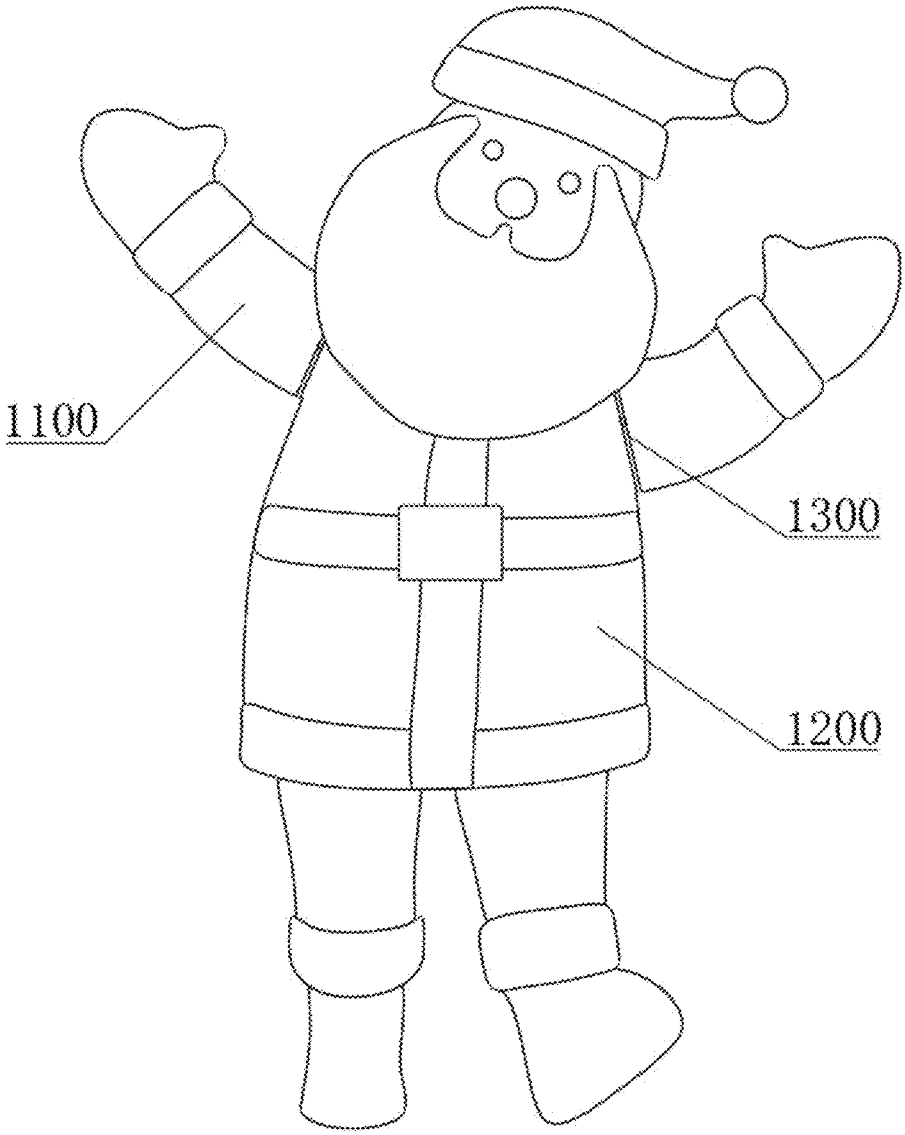
FIG. 24 is a schematic diagram of a modified embodiment of the second embodiment of the present invention.

As shown in FIG. 22 and FIG. 23, in this embodiment, the decoration body 1000 is Santa Claus, in which the fixed body 1200 is the trunk part of Santa Claus, the movable body 1100 is the head, and the movable end 1300 is the root of the head, so that when the driving component 2000 operates, Santa Claus's head can move back and forth from left to right. In the variant of this embodiment, as shown in FIG. 24, the fixed body 1200 is the trunk part of Santa Claus, while the movable body 1100 is two arm parts, and the movable end 1300 is the root part of the arm part. Therefore, when the movable body 1100 moves, both arms can wave.

Figure 25:
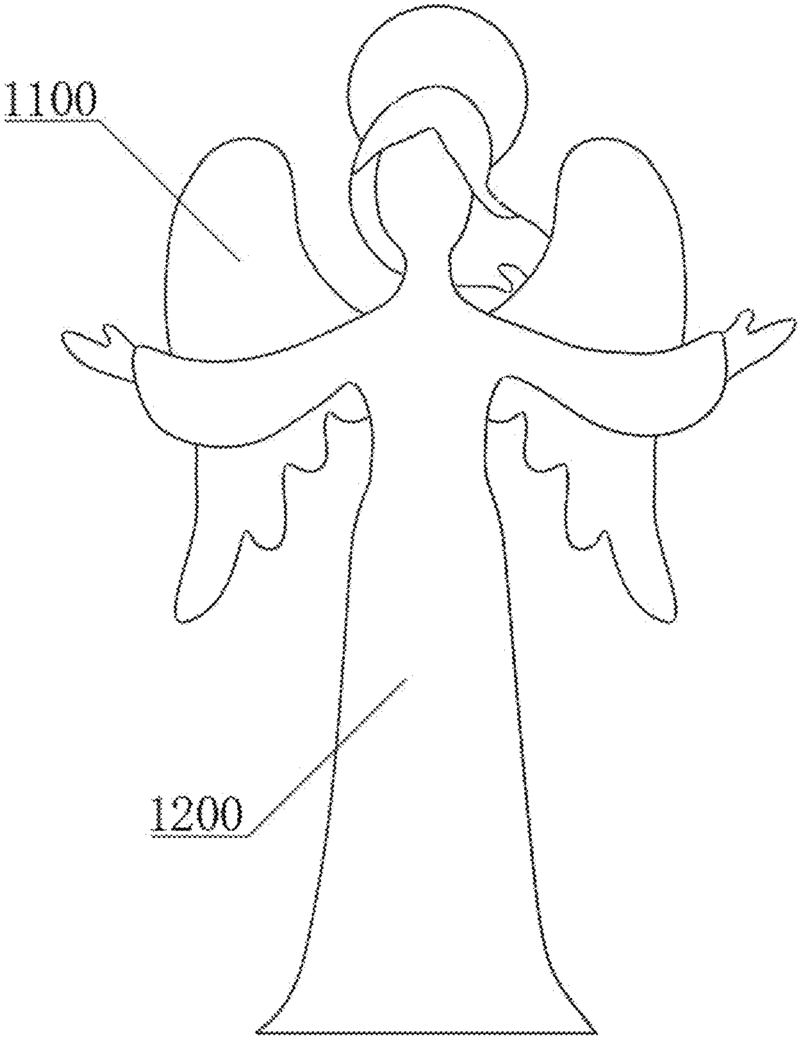
FIG. 25 is a schematic diagram of the third embodiment of the decoration body of the present invention.
Figure 26:
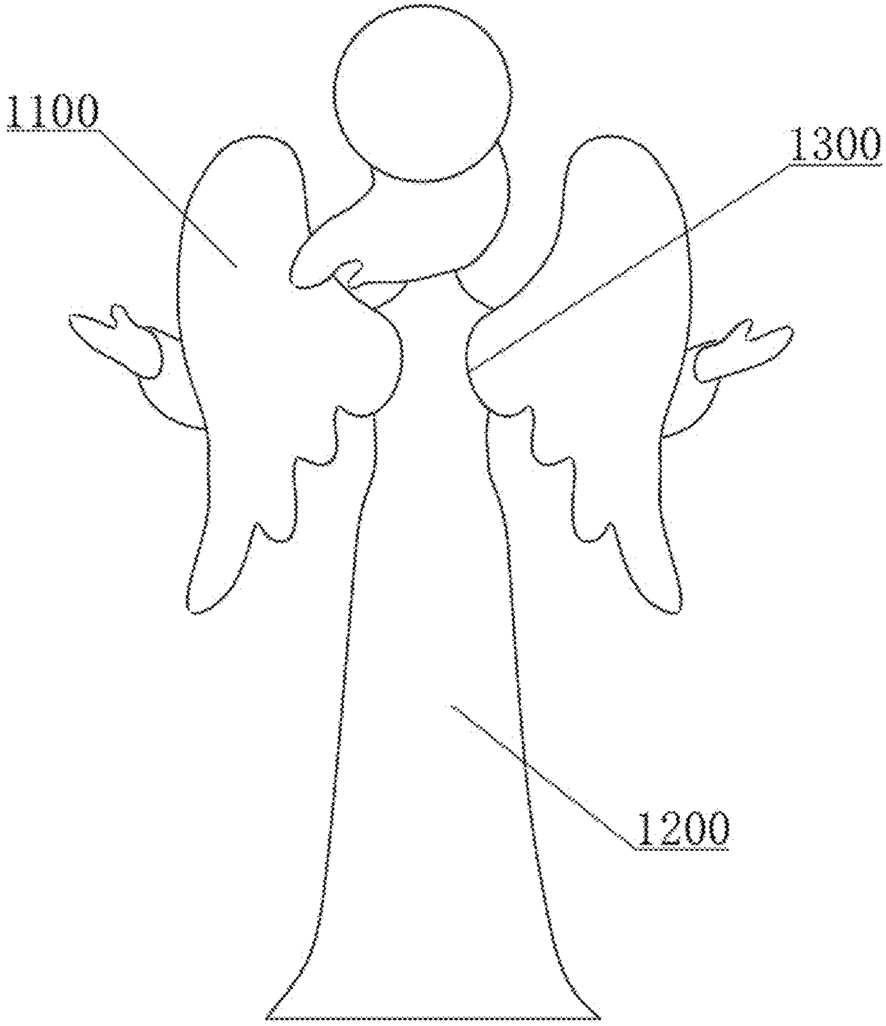
FIG. 26 is a schematic view of the back of FIG. 25.

An angel can also be set in the form of wings opening and closing, as shown in FIGS. 25 and 26. In this embodiment, the decoration body 1000 is an angel image, in which the fixed body 1200 is the trunk part of the angel, while the movable body 1100 is two wing parts, and the movable end 1300 is the root part of the wing part. Therefore, when the movable body 1100 moves, the two wings move with each other and make wing opening and closing actions.

When the imitation decoration is an arthropod image such as crab, shrimp, spider, etc. (not shown), then the movable body 1100 can be set as the foot of the arthropod, and a plurality of movable feet can be provided, so that when all the feet move, the crawling action of the arthropod can be simulated.

When the copying decoration is an image of a cow, a horse, a deer and a unicorn (not shown), the movable body 1100 can be additionally set as a tail, and the tail is made of silk hair, so that when the tail moves, the tail of the silk hair material can be swung back and forth. In this way, the head and tail move at the same time, which makes the copying decoration more vivid.

Figure 27:
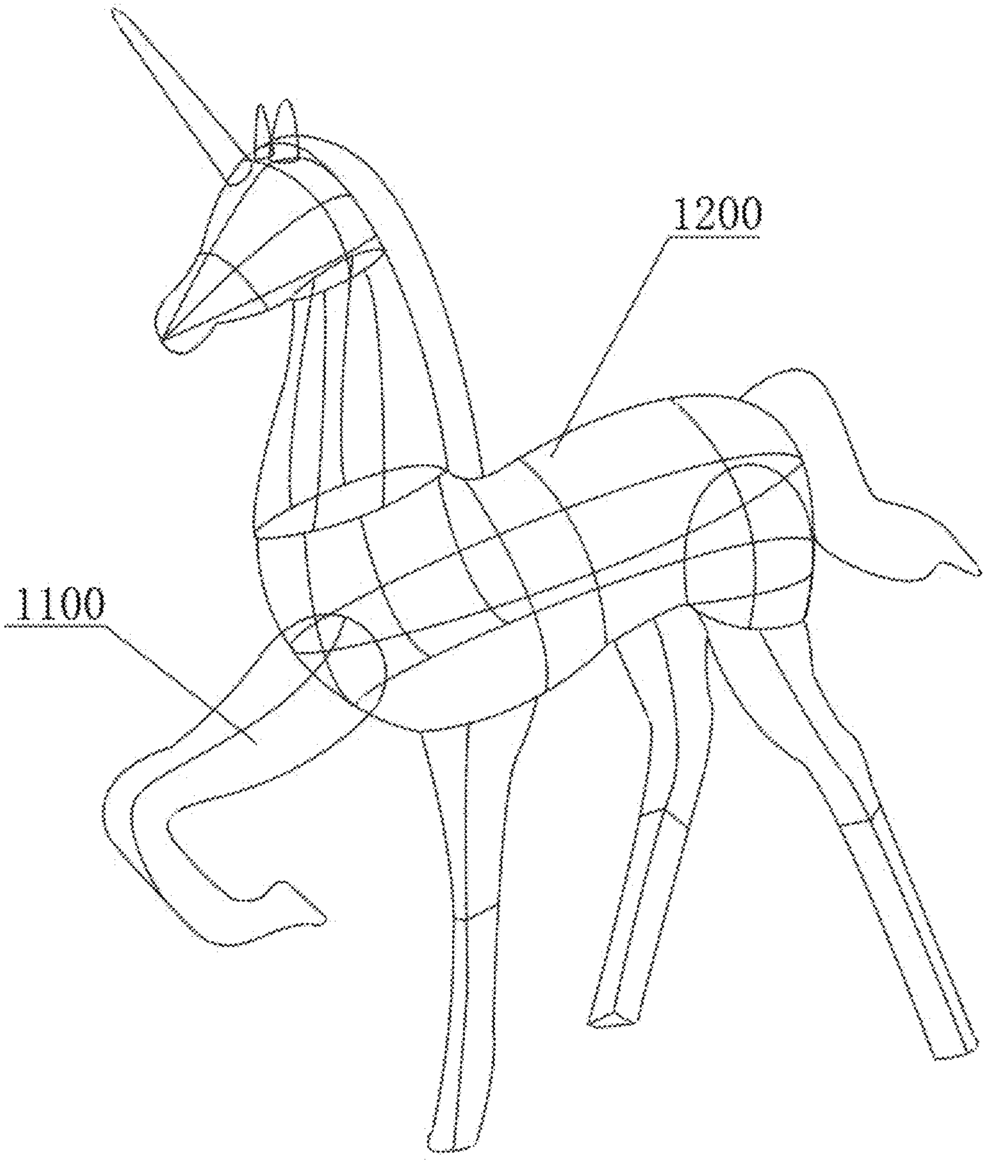
FIG. 27 is a schematic diagram of the fourth embodiment of the decoration body of the present invention.
Figure 28:
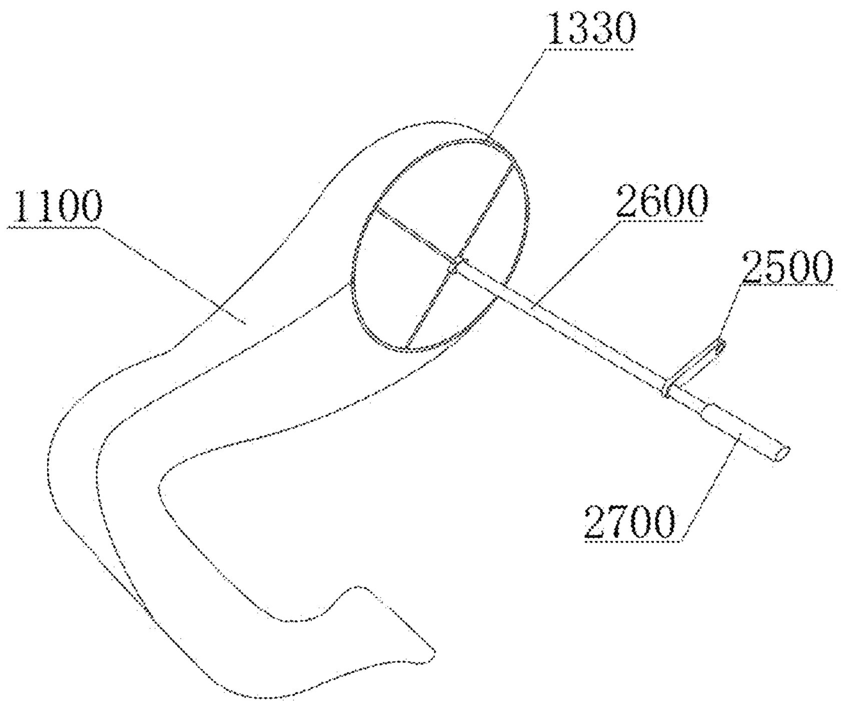
FIG. 28 is a schematic view of the local structure of the movable body in FIG. 27.

When the copying is decorated with images of cattle, horses, deer and unicorns, as shown in FIGS. 27 and 28, the movable body 1100 can also be set as a leg, and the movable end 1300 is set at the root of the thigh, so that the leg can move up and down when the driving component 2000 operates, so that the leg lifting action can be realized.

Referring to FIG. 1 to FIG. 4, in this embodiment, the decoration body 1000 is hollow, welded by several iron wires, and has a stable structure. After artistic processing, the decoration body 1000 has the shape of animal simulation and is lifelike.

In other embodiments (not shown), if the decoration body 1000 is made of hard plastic, then the decoration body 1000 can be processed by welding, extrusion molding, injection molding, blow molding, foam molding, calendering, vacuum molding, etc.

The decoration body 1000 includes a movable body 1100 and a fixed body 1200, and the movable body 1100 is rotatably engaged with the fixed body 1200. In addition, the decoration body 1000 is provided with an illuminating module 1600 including a light source 1610 and a power supply 1620; the illuminating module 1600 is detachably connected to the decoration body 1000. The light source 1610 can be arranged at at least one position outside and inside the decoration body 1000 to achieve the lighting and decorative effects. The light source 1610 includes but is not limited to LED, light string, lamp tube, light bulb, light strip or all other devices that can achieve the lighting effect. Of course, lamps, strips and strings with decorative items can also be used.

Moreover, in other embodiments (not shown), the movable copying decoration can also be equipped with an intelligent controller, through which the lighting and the activities of the movable body 1100 can be intelligently controlled, so that the copying decoration can automatically perceive and respond to external music rhythm or preset scene changes. In an extension of this embodiment, music can be stored in the intelligent controller in advance, and a speaker connected with the intelligent controller is installed in the copying decoration. Therefore, during the copying decoration activity, the intelligent controller can automatically play the preset music through the speaker, and at the same time, the copying decoration follows the rhythm of the played music. Therefore, this way aims to have a richer and more vivid visual experience after copying decoration activities, which greatly enhances the artistic expression and appreciation of decoration. Moreover, in another extension of this embodiment, the intelligent controller can also be connected with intelligent electronic devices such as mobile phones and tablet computers through wireless connection such as Bluetooth, and these intelligent electronic devices develop professional control software accordingly. Therefore, the professional control software on these intelligent electronic devices can be used to remotely and accurately control and adjust the color, brightness, change mode of copying decoration lights and the motion trajectory, speed, amplitude and other parameters of dynamic components, thus greatly improving the user experience.

Figure 5:
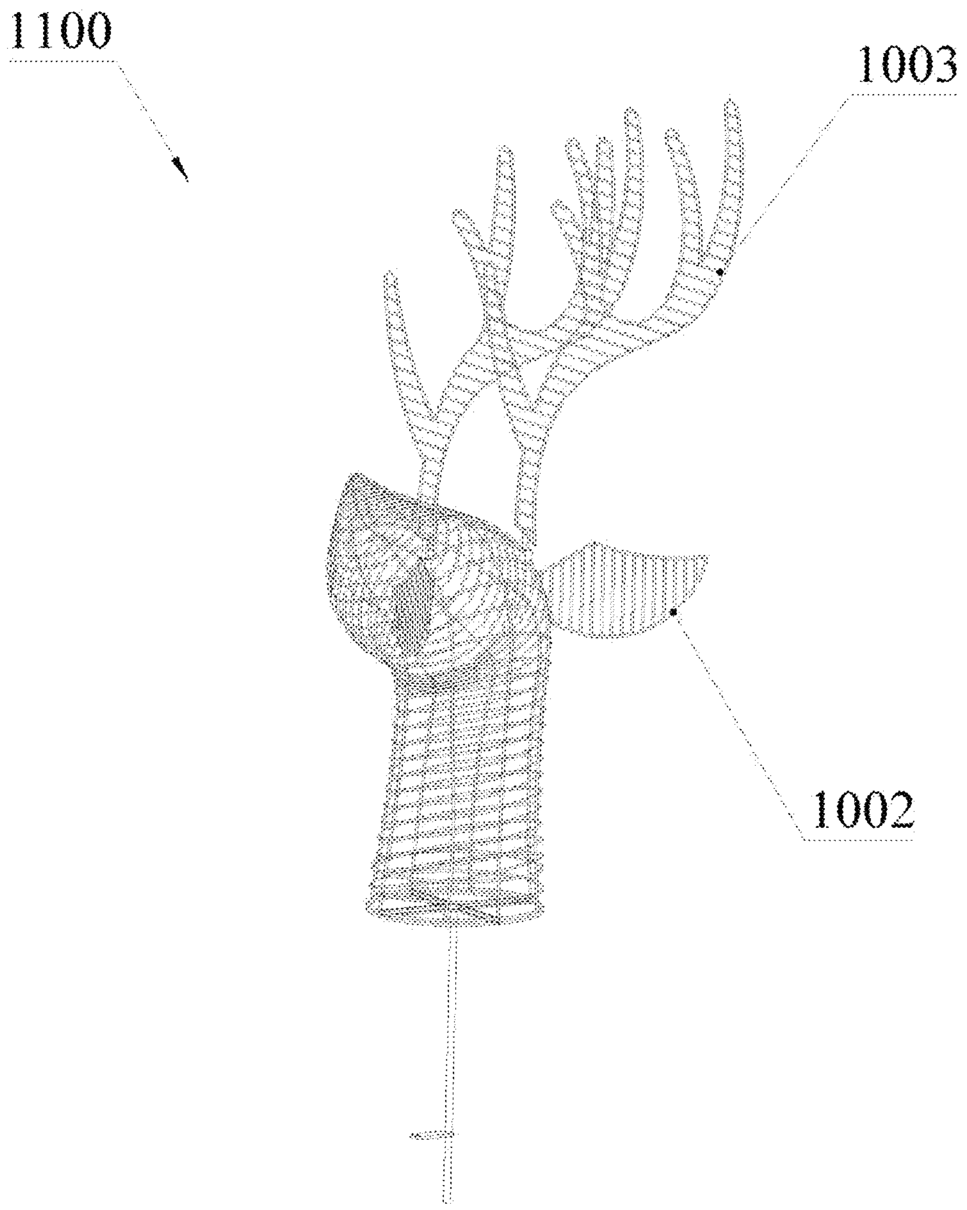
FIG. 5 is a schematic structural diagram of the movable body of the present invention.
Figure 6:
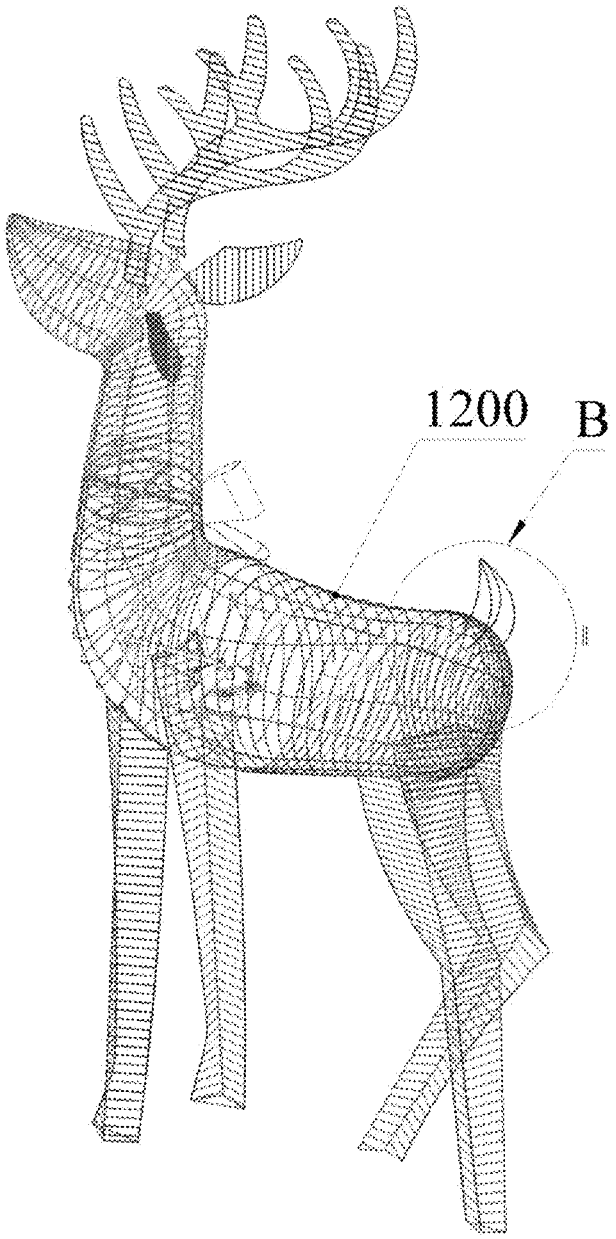
FIG. 6 is a schematic diagram of the position of the tail of the present invention.
Figure 7:
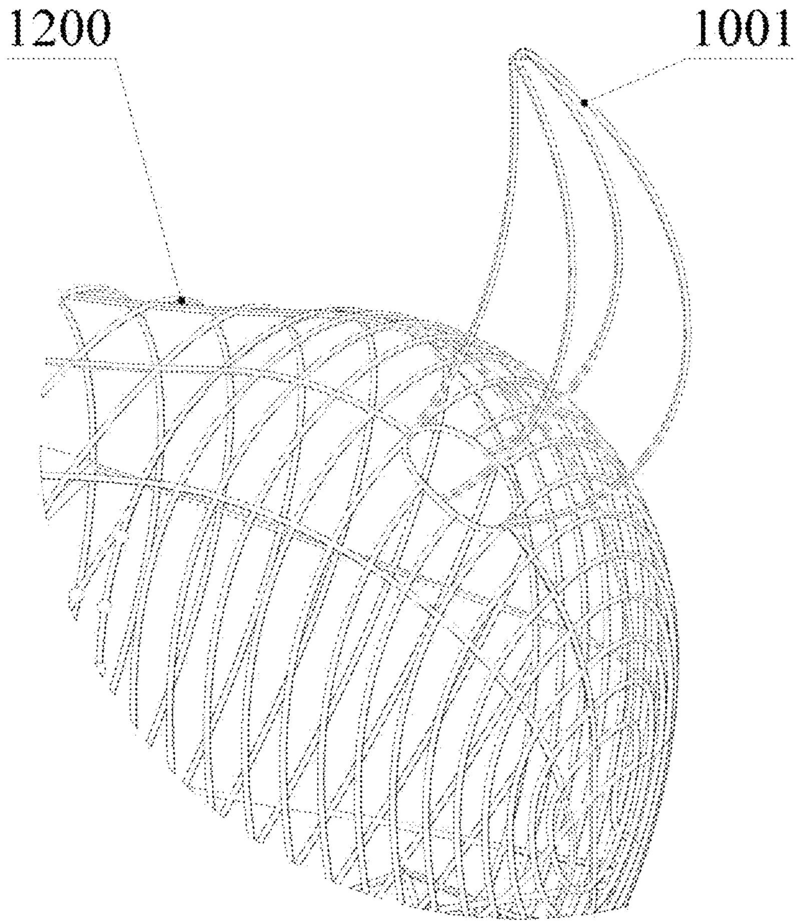
FIG. 7 is a partially enlarged schematic view at B in FIG. 6.
Figure 8:
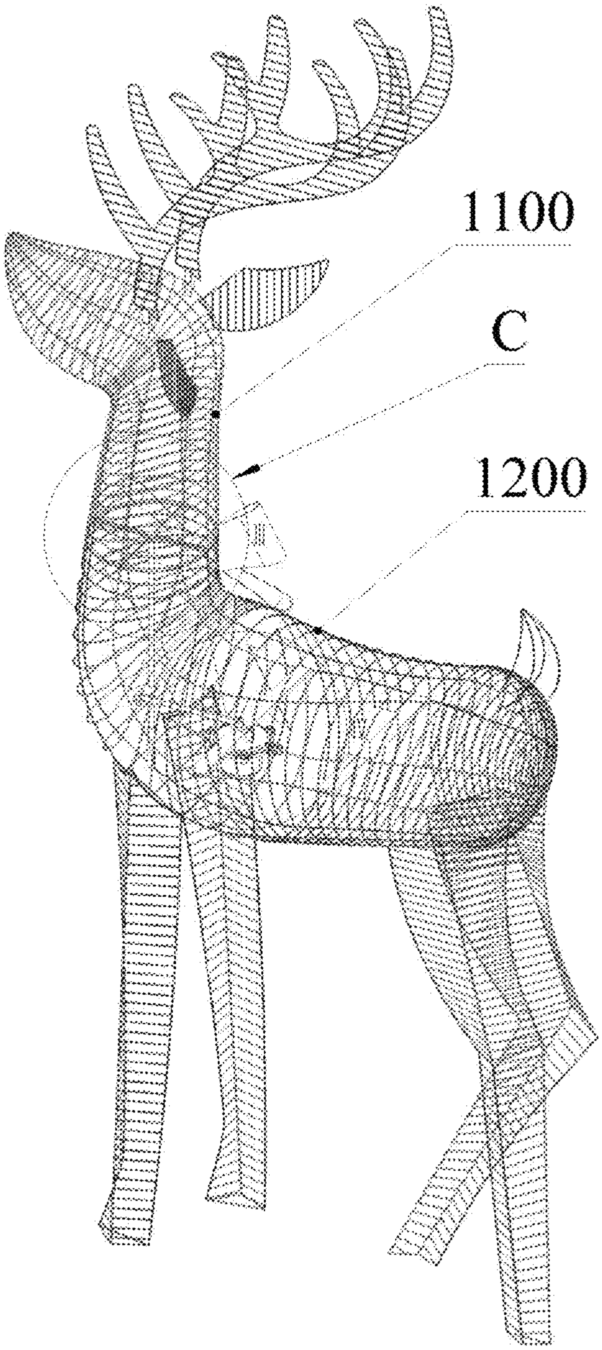
FIG. 8 is a schematic diagram of the connection position of the movable end and the ring frame of the present invention.
Figure 9:
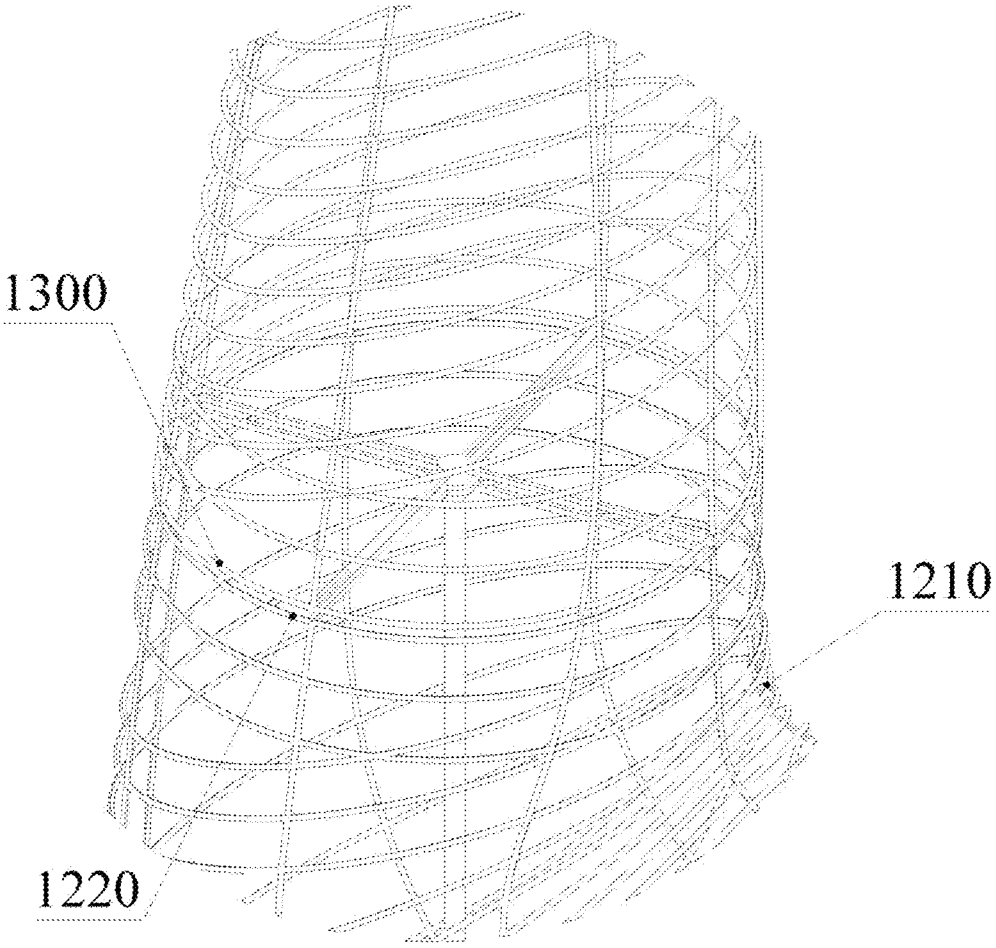
FIG. 9 is a partially enlarged schematic view at C in FIG. 8.
Figure 10:
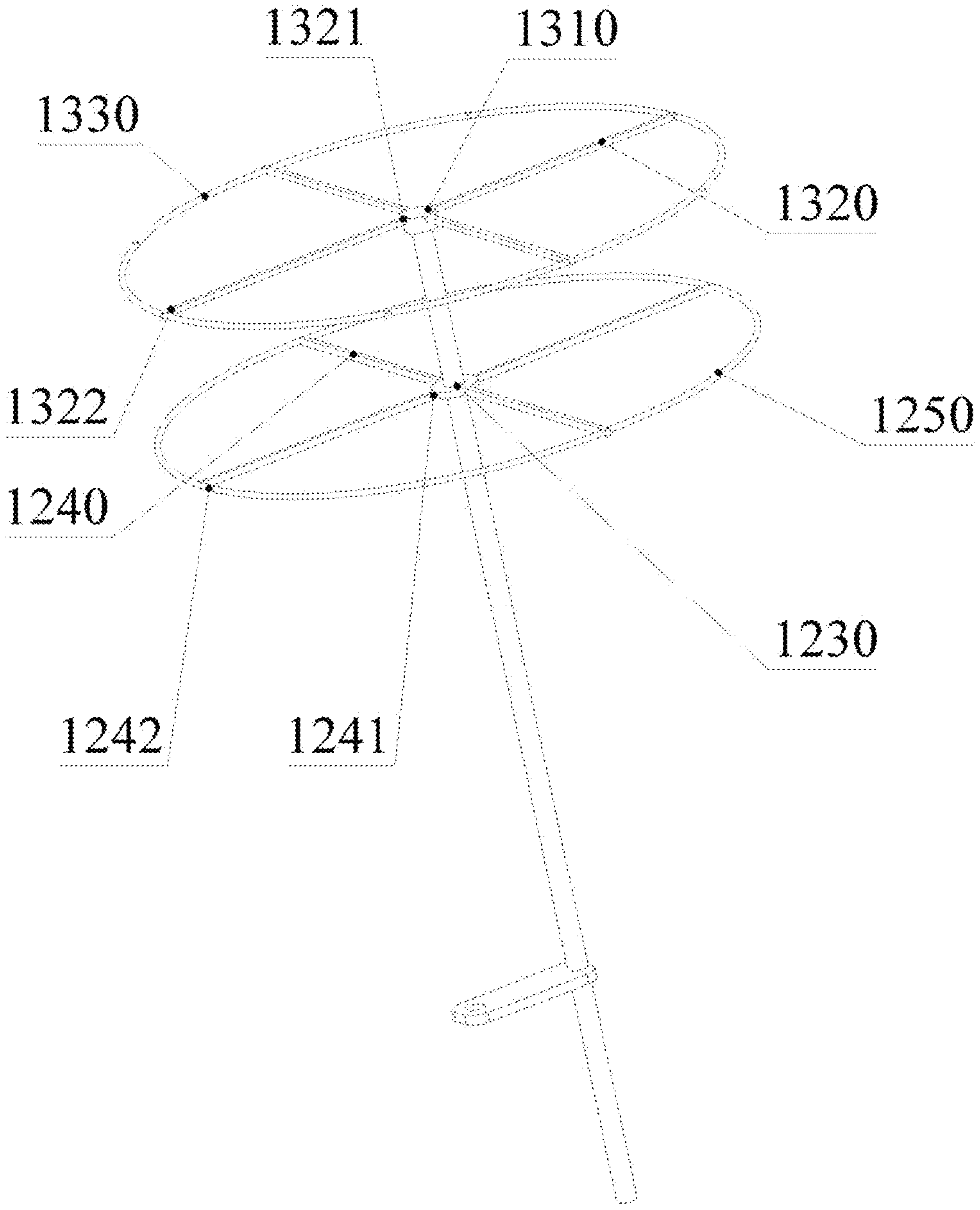
FIG. 10 is a schematic structural view of the movable end and the ring frame of the present invention.
Figure 11:
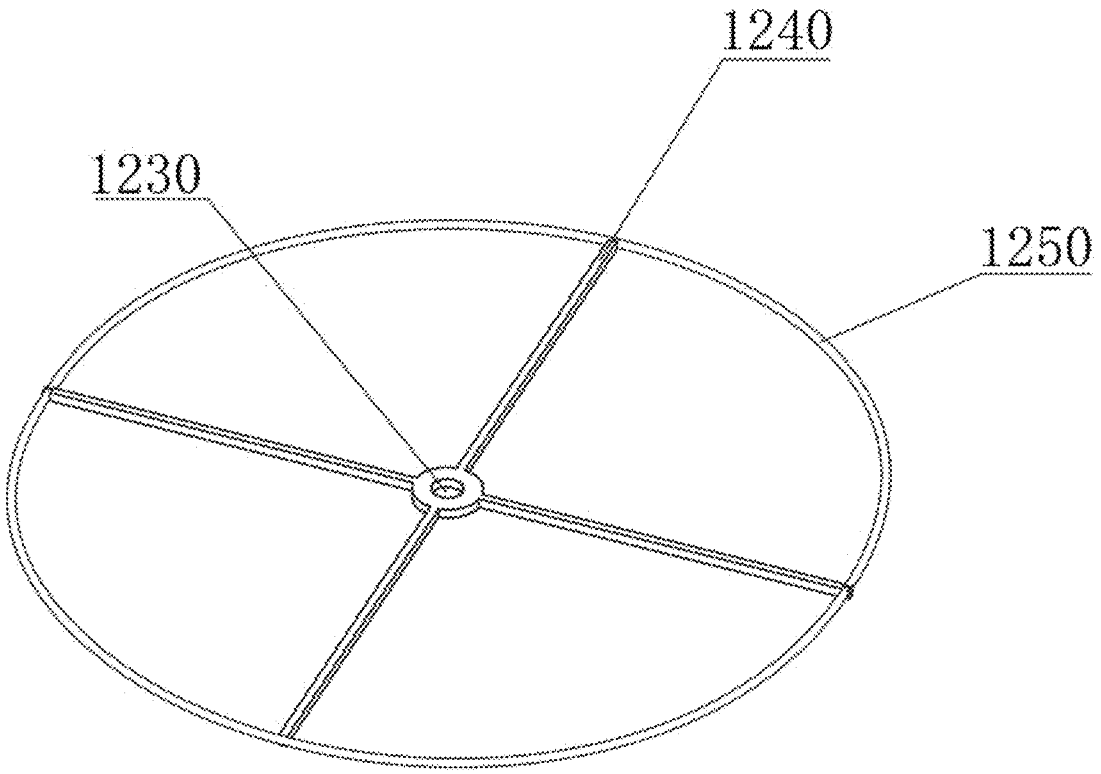
FIG. 11 is a schematic structural diagram of the ring frame of the present invention.

Referring to FIG. 5, in this embodiment, a pair of antlers 1003 and a pair of ears 1002 are also arranged on the movable body 1100, which are symmetrically arranged on the movable body 1100, and the antlers 1003 and ears 1002 are fixedly connected with the movable body 1100. Similarly (as shown in FIGS. 6 and 7), a tail 1001 is also arranged on the fixed body 1200, and the tail 1001 is also fixedly connected to the fixed body 1200, so that the movable copying decoration is more realistic and lifelike. In this embodiment, the material of the ear 1002 can be a hard material or a flexible material. The hard material is metal or hard plastic, which makes the ear 1002 more durable. The flexible material can be textile fabric or simulated wool, so as to make the ear 1002 more beautiful and realistic. The antlers 1003 can only be made of a hard material, such as nylon, to make them stronger.

Of course, in other embodiments (not shown), the materials of the decoration body 1000 and the corresponding parts can be adjusted according to different images of the copying decoration, so that the copying decoration is more realistic and beautiful.

Referring to FIGS. 1 to 10, in this embodiment, the movable body 1100 is provided with a movable end 1300, which is arranged at the bottom of the movable body 1100, and the movable body 1100 is connected to the fixed body 1200 through the movable end 1300; and the fixed body 1200 has a joint part 1210, which is arranged below the movable body 1100 and extends from the fixed body 1200. The joint part 1210 is provided with a ring frame 1220, which is arranged at the top of the joint part 1210, and the movable end 1300 and the ring frame 1220 are parallel to each other. The movable end 1300 of the movable body 1100 includes a central hub 1310, upper spokes 1320 and a movable body outer ring 1330, and the ring frame 1220 includes a central hole 1230, lower spokes 1240 and a joint part outer ring 1250. One end 1321 of the upper spoke 1320 is connected to the central hub 1310, the other end 1322 is connected to the movable body outer ring 1330; the inner end 1241 of the lower spoke 1240 is connected to the central hole 1230, and the outer end 1242 of the lower spoke 1240 is connected to the joint part outer ring 1250; the lower spokes 1240 are equidistantly arranged along the circumferential direction of the central hole 1230, and the central hub 1310 has a thickness, so that when the movable body

Figure 12:
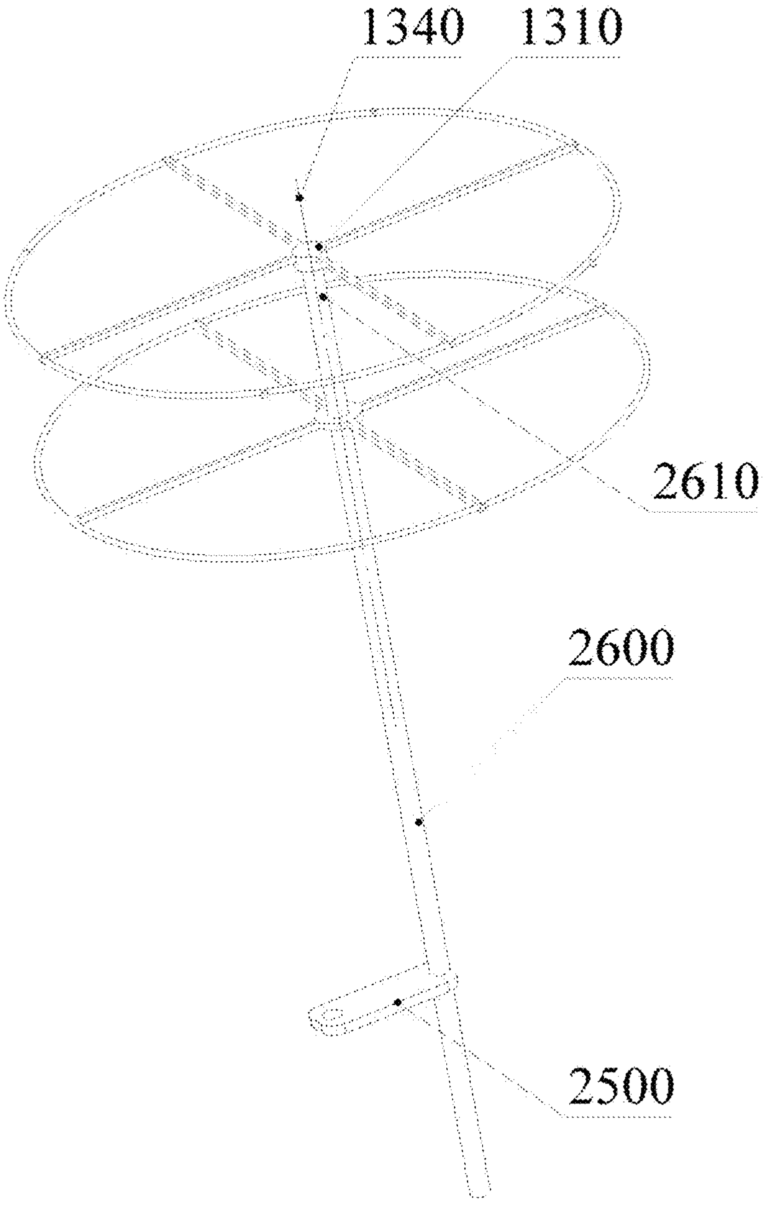
FIG. 12 is a schematic view of the rotating rod of the present invention.
Figure 13:
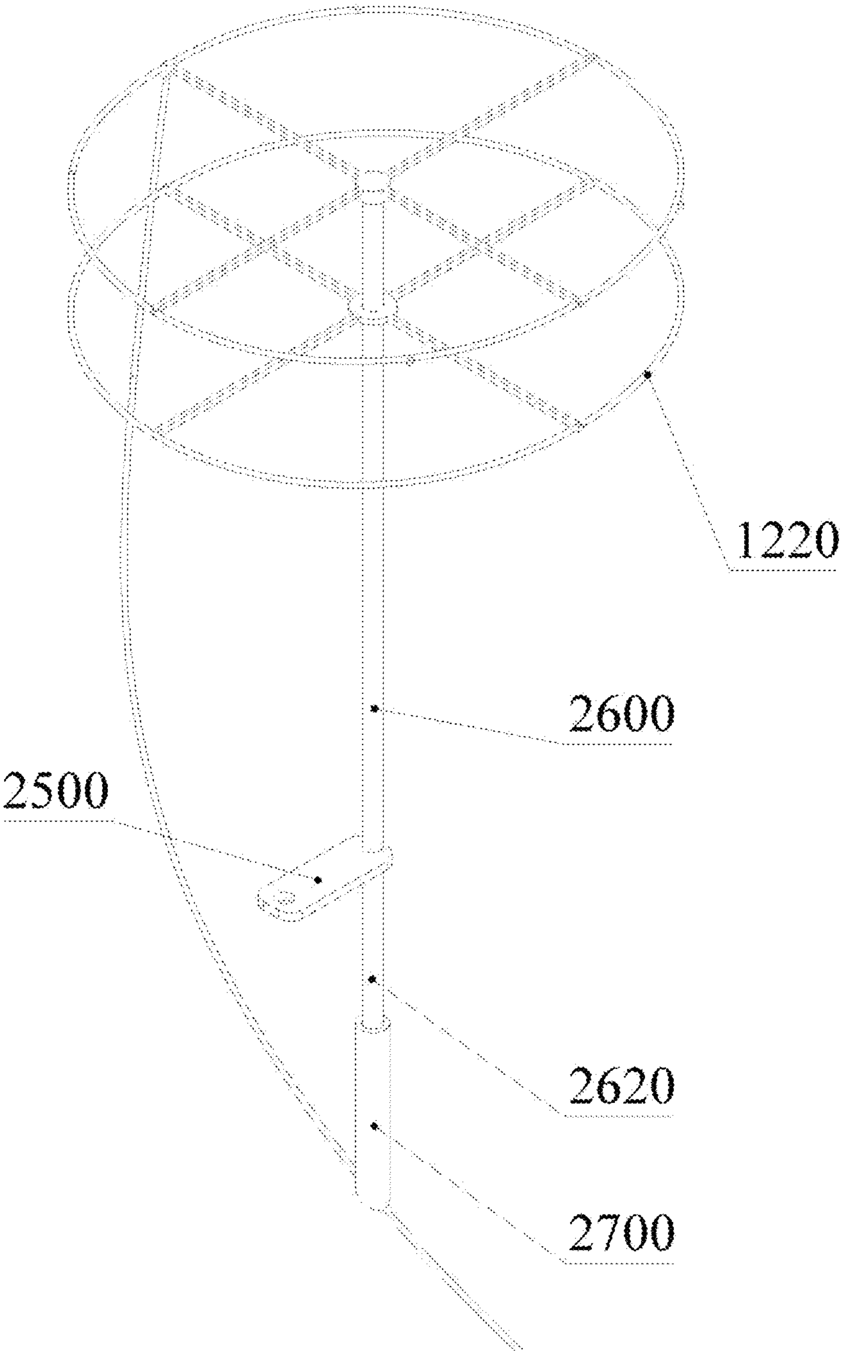
FIG. 13 is a schematic view of the rotating rod and the rotating base of the present invention.

1100 rotates relative to the joint part 1210 of the fixed body 1200, the movable body outer ring 1330 and the joint part outer ring 1250 can be kept parallel and always separated by a certain distance.

Wherein (see FIG. 8 to FIG. 12), the diameter of the movable end 1300 and the ring frame 1220 are the same, so that the position where the movable body 1100 is connected with the joint part 1210 has a smooth and vivid appearance; the rotating rod 2600 coincides with the central axis 1340 of the central hub 1310, and the upper end 2610 of the rotating rod 2600 is integrally formed with the central hub 1310 of the movable end 1300. The lower end 2620 of the rotating rod 2600 passes through the central hole 1230 of the ring frame 1220 and is inserted into the rotating base 2700 (see FIG. 12). The connecting element 2500 is welded on the rotating rod 2600, and the rotating base 2700 is arranged in a cylindrical shape with a hollow interior to accommodate the lower end 2620 of the rotating rod 2600.

In other embodiments (not shown), the movable end 1300 can also have other structures, the movable end 1300 can be provided with a fan-shaped structure, a spiral structure and the like, thus allowing the rotating rod 2600 to be fixedly connected to the structure of the movable body 1100, and the upper spokes 1320 and the lower spokes 1240 can also be detachably connected to the movable end 1300 and the ring frame 1220.

In other possible embodiments (not shown), the rotating base 2700 can be arranged in different structures, the rotating base 2700 can have a square surface, a circular surface or other shapes, and a rolling device (not shown) can also be arranged in the rotating base 2700, so that the rotating friction resistance between the rotating rod 2600 and the rotating base 2700 is smaller. The rotating base 2700 can also pass through a slideway arranged on the fixed body 1200. The rotating base 2700 can also be movably connected to the fixed body 1200 through a slide rail provided on the fixed body 1200, so that the rotating rod 2600 can move in other directions.

Figure 14:
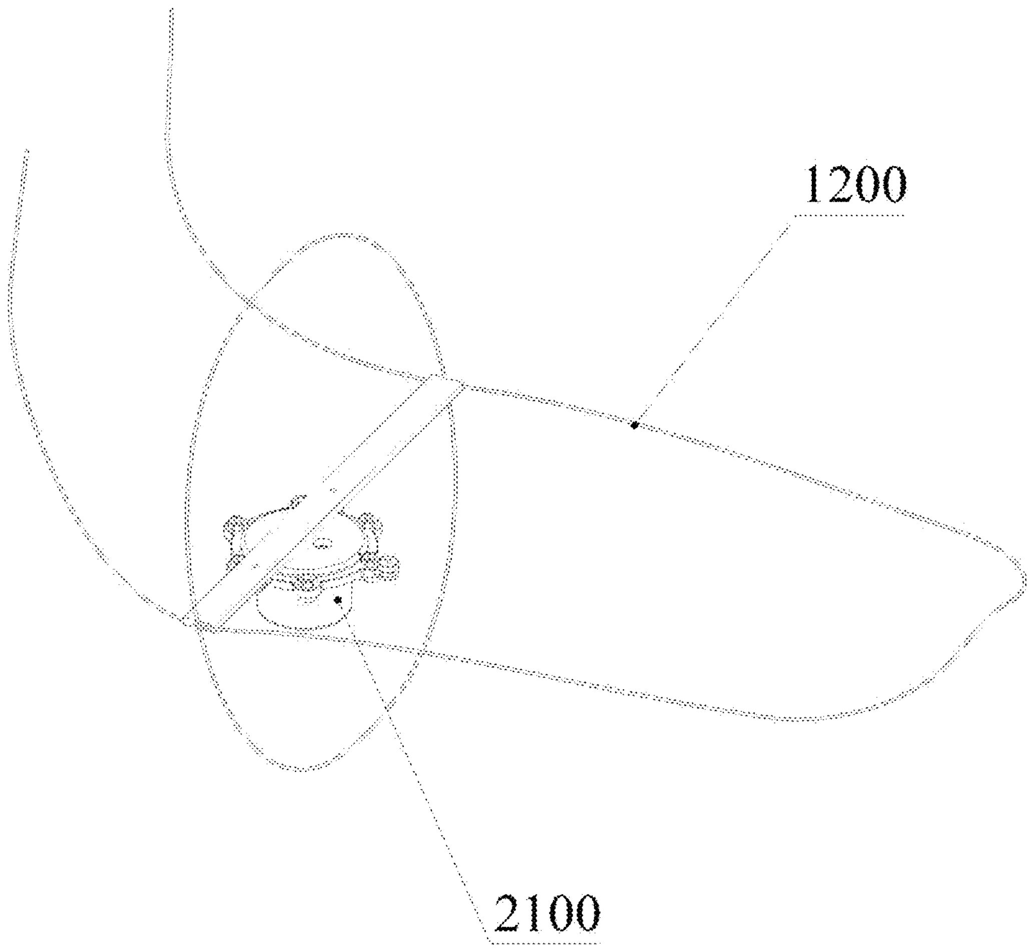
FIG. 14 is a schematic diagram of the position of the motor of the present invention.
Figure 15:
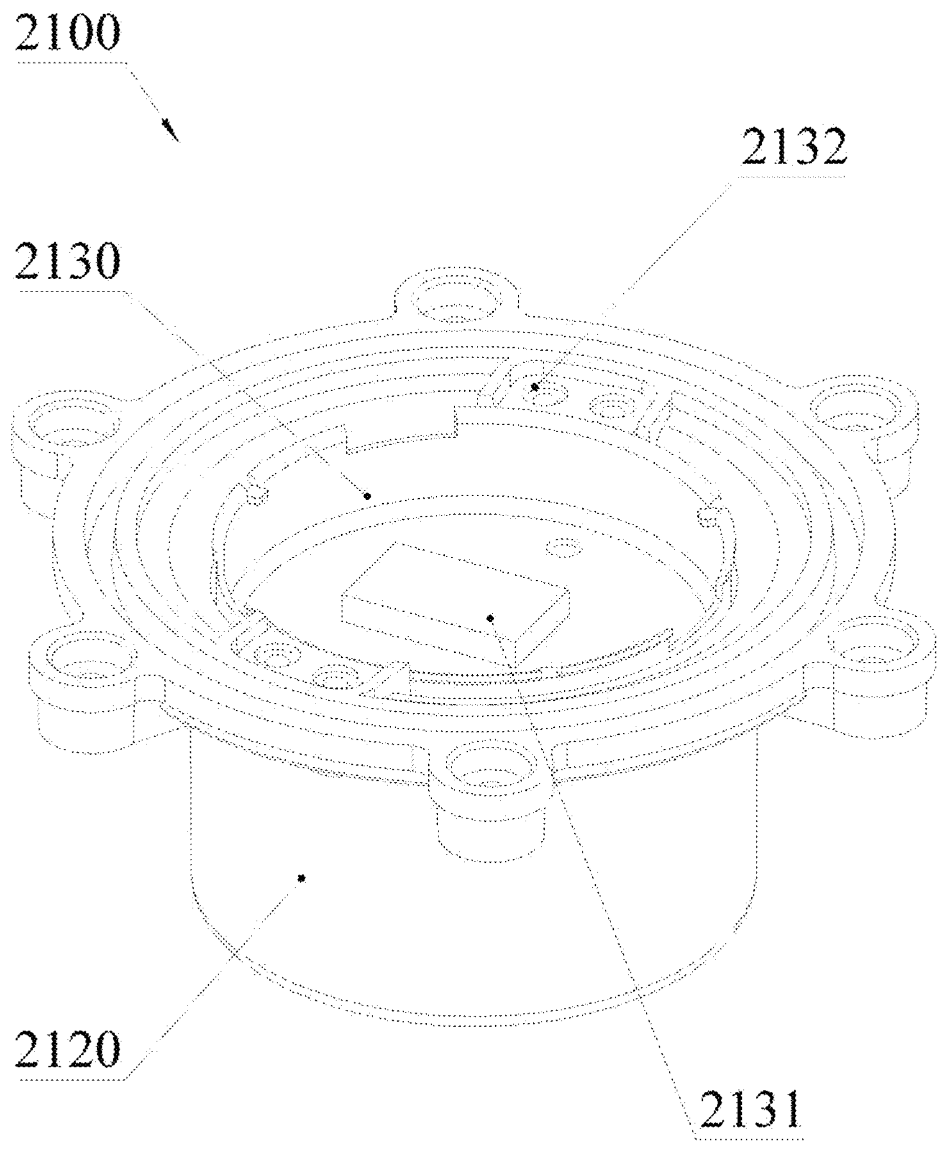
FIG. 15 is a schematic structural diagram of the motor of the present invention.
Figure 16:
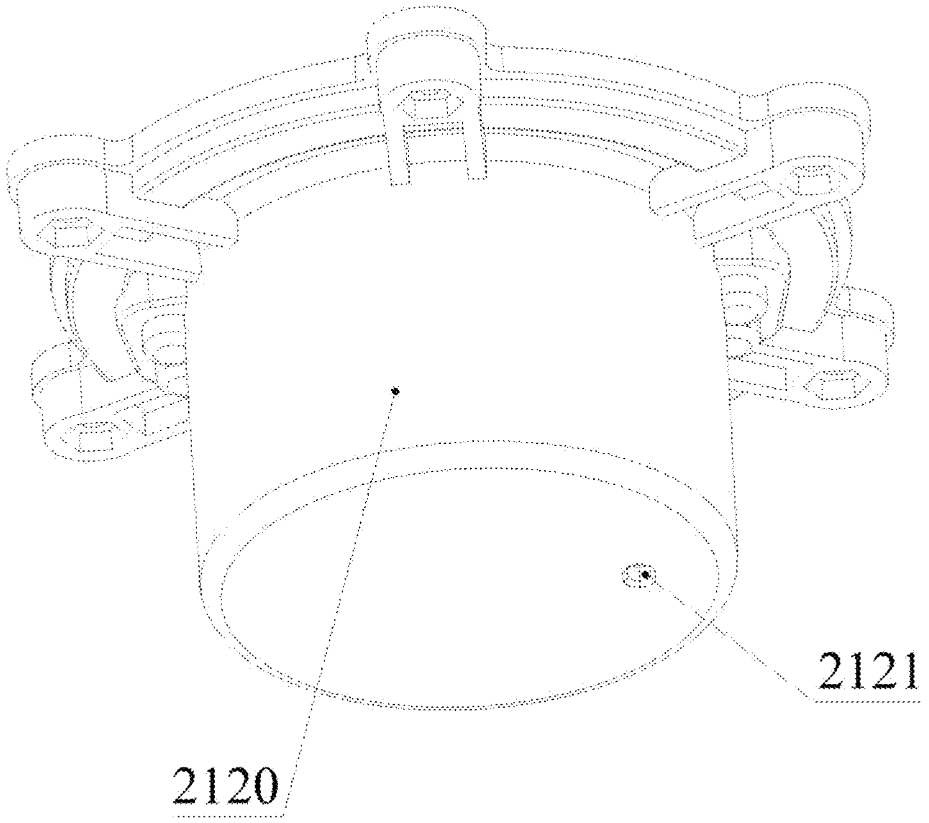
FIG. 16 is a schematic diagram of the power supply interface of the present invention.
Figure 17:
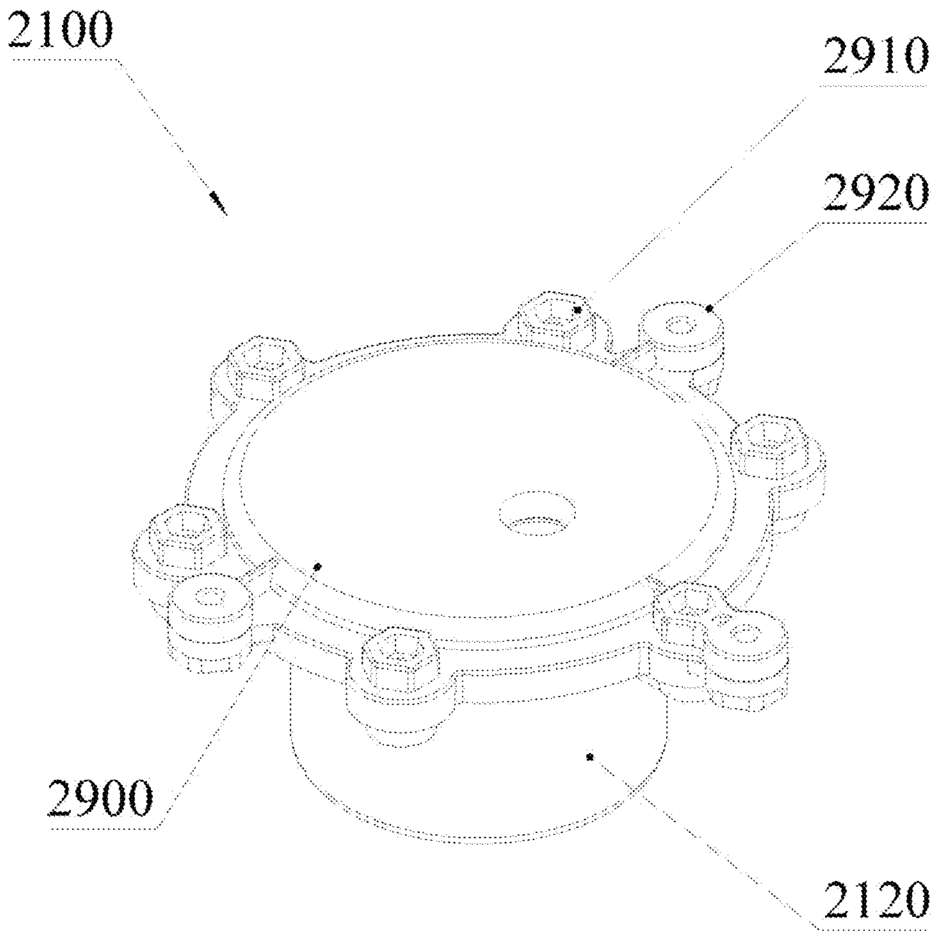
FIG. 17 is a schematic view of the fixing cover of the present invention.

Referring to FIGS. 14 and 15, a motor 2100 is arranged in the fixed body 1200, and the motor 2100 has an inner shell 2130 and an outer shell 2120; the inner shell 2130 is provided with a threaded groove 2132, through which the inner shell 2130 and the outer shell 2120 can be fixedly connected, and a PCB board 2131 is also arranged in the inner shell 2130 of the motor 2100, (as shown in FIG. 16), and a power supply interface 2121 is provided on the bottom surface of the outer shell 2120 of the motor 2100, and the power supply interface 2121 is electrically connected with the PCB board 2131, so that the motor 2100 can be powered; a fixed disk 2900 (as shown in FIG. 17) is also provided on the motor 2100, and the fixed disk 2900 is connected to the top end of the outer shell 2120 in a buckling manner. Six connecting holes 2910 are equidistantly arranged in the circumferential direction on the fixed disk 2900, and the fixed disk 2900 and the outer shell 2120 are connected together by using fasteners to pass through the connecting holes 2910, and the fixed disk 2900 is also provided with an opening through which the motor shaft 2110 can pass.

In other embodiments (not shown), the circuits on the PCB board 2131 include well-known circuits for performing functions, including but not limited to an antenna system, an RF transceiver, one or more amplifiers, a tuner, one or more oscillators, a digital signal processor, a CODEC chipset, a subscriber identity module (SIM) card, a memory, and the like.

In other embodiments (not shown), a human body proximity sensor can also be installed on the decoration body 1000, and the human body proximity sensor is in signal connection with the intelligent controller. Therefore, when someone approaches the decoration body 1000 and is located in the sensing range of the human proximity sensor, it will be sensed by the human proximity sensor, and the sensing information will be converted into an electrical signal and sent to the intelligent controller, and then the intelligent controller will automatically start the motor 2100, thus making the copying decoration active. When the human body is far away from the sensing range of the sensor, the intelligent controller will turn off the motor 2100, thus stopping the copying decoration. Therefore, in this way, copying decoration can stop its activities under the condition of no one, which plays an energy-saving role.

Figure 18:
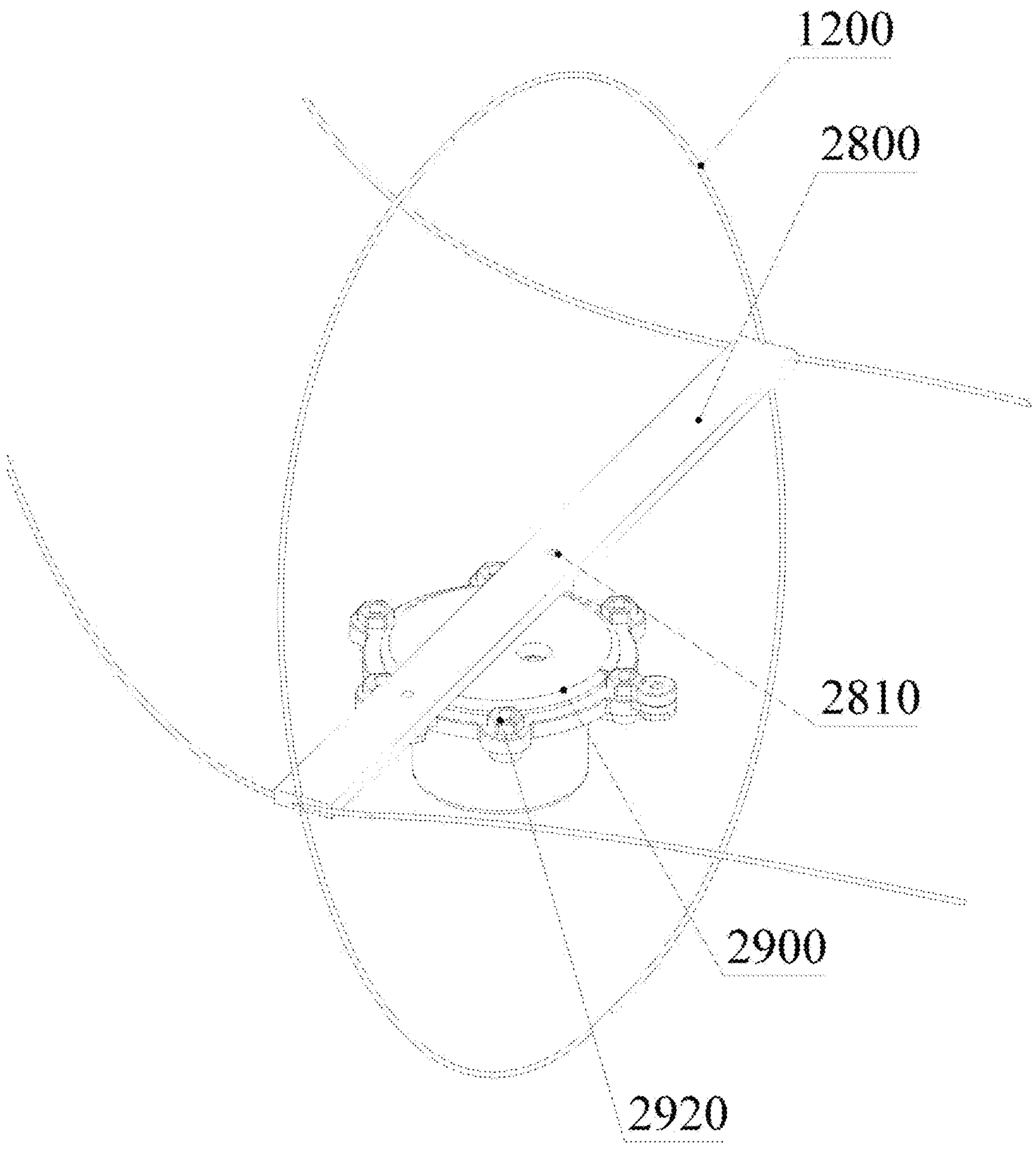
FIG. 18 is a schematic view of the fixed plate of the present invention.

Referring to FIGS. 17 and 18, the fixed disk 2900 is also provided with a fixed plate 2800, both ends of which are fixed on the fixing body 1200, and the fixed plate 2800 is also provided with a through hole 2810, and the fixed disk 2900 is provided with at least one hole seat 2920 in the circumferential direction, and the through hole 2810 corresponds to the hole seat 2920, and the fixed disk 2900 and the fixed plate 2800 are connected by external fasteners, so that the motor 2100 can be stably and fixedly connected to the fixed plate 2800. The lower surface of the motor 2100 does not need to be provided with any other supporting structure, and the motor 2100 can be suspended in the fixing body 1200.

In other embodiments (not shown), the motor 2100 can be fixed to the fixed body 1200 by other ways. Further, the application of the present invention is not limited to the embodiment in which the motor 2100 can move in the second part. The motor 2100 can also be connected to the fixed body 1200 through ways and structures arranged in the fixed body 1200, such as slideways, ropeways, hooks, hook and loop, articulated shafts, bolts, springs, etc. In addition, the fixed disk 2900 can also be provided with other number of fixing structures, which can be one, two or more than three, so as to ensure the stable fixing between the fixed disk 2900 and the outer shell 2120. In addition, in other embodiments (not shown), the fixed plate 2800 can also be fixed in the fixing body 1200 by other structures such as slideways, rod groups and bolts.

Figure 19:
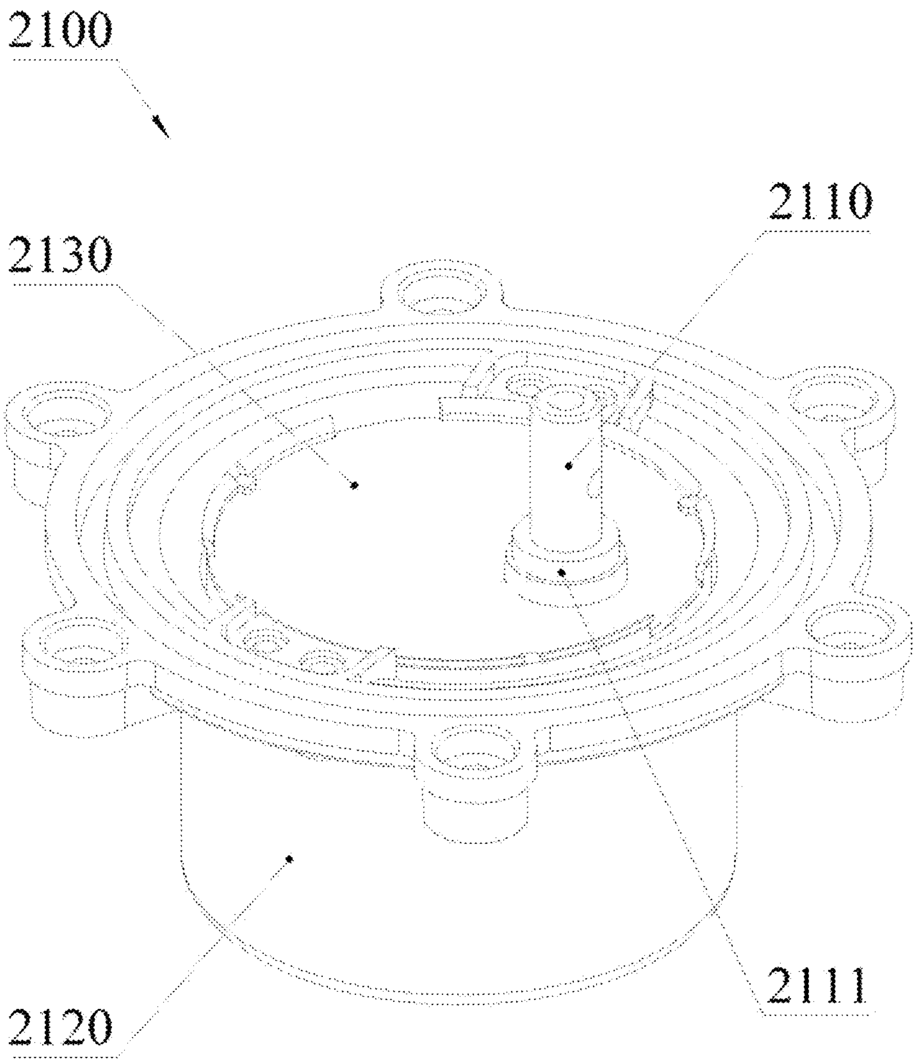
FIG. 19 is a schematic view of the motor shaft of the present invention.

Referring to FIG. 19, the upper surface of the inner shell 2130 is provided with a motor shaft 2110, which has a hollow structure and a cylindrical surface, and a multi-stage cylindrical step 2111 is also provided at the position where the motor shaft 2110 is connected with the motor 2100. Driven by the motor 2100, the motor shaft 2110 makes a circular rotation motion from 0 to 360 degrees, and rotary motion is transmitted to the rotating rod 2600 step by step through the transmission mechanism 2200.

In other embodiments (not shown), the motor shaft 2110 can also have a quadrangular or circular outer surface. In addition, the motor shaft 2110 can have different working and operating forms, such as the motor shaft 2110 repeatedly rotates from 0 to 180 degrees, or the motor shaft 2110 will move in a sine or cosine way.

Figure 20:
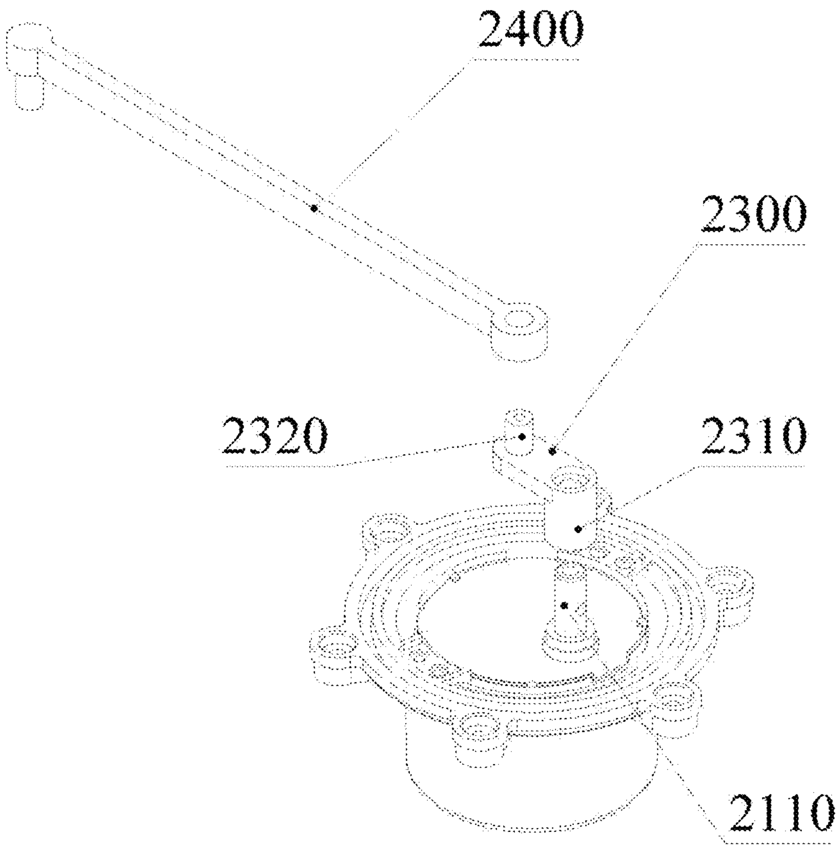
FIG. 20 is a schematic structural view of the driving rod of the present invention.

Referring to FIG. 20, the driving element 2300 is connected with the motor shaft 2110. Specifically, the driving element 2300 includes a connecting part 2320 and a fixed part 2310, which are rotatably engaged with the motor shaft 2110, and the connecting part 2320 is rotatably engaged with the transmission rod 2400. The shape of the driving element 2300 is set in a "Z" shape, and the middle part is set in a plate shape. The connecting part 2320 protrudes from its lower surface, and the fixed part 2310 protrudes from its lower surface. Both the connecting part 2320 and the fixed part

2310 have cylindrical shapes, and the connecting part 2320 and the fixed part 2310 are spaced apart in space. The fixed part 2310 has a hollow structure. The fixed part 2310 is sleeved on the motor shaft 2110 to form a rotatable connection with the motor shaft 2110. The connecting part 2320 of the driving element 2300 is connected with a transmission rod. Driven by the motor 2100, the connecting part 2320 of the driving element 2300 can make a circular motion around the fixed part 2310.

In other embodiments (not shown), the driving element 2300 can also be provided with other structures such as a cam, a gear, a belt and the like to match the different operation forms of the motor 2100, and the connection mode between the driving element 2300 and the motor shaft 2110 can also be a fixed connection or a sliding connection.

Figure 21:
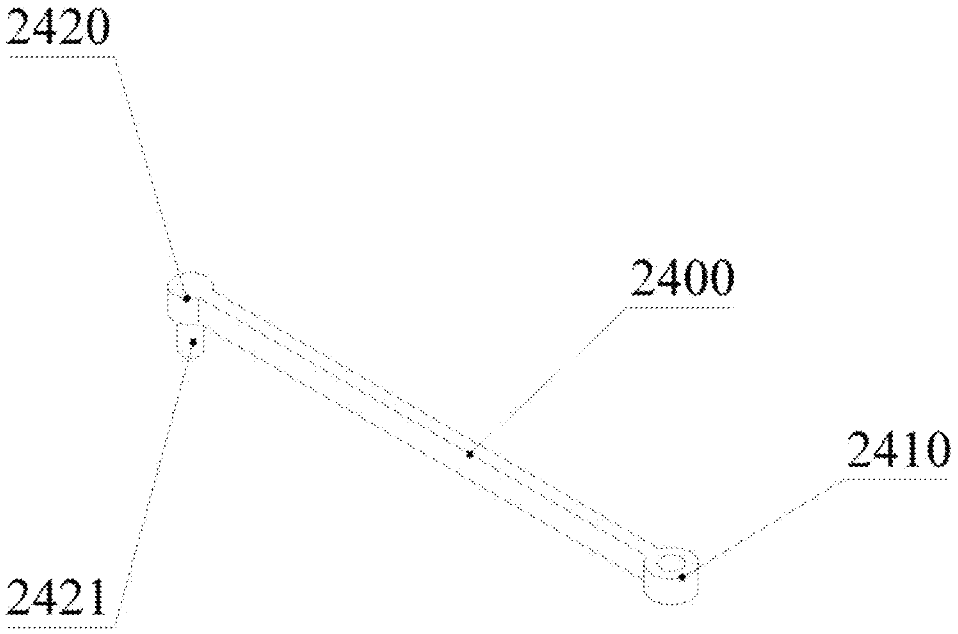
FIG. 21 is a schematic structural diagram of the transmission rod of the present invention.

Referring to FIG. 20 and FIG. 21, in this embodiment, the transmission rod 2400 is arranged in a long strip shape, and a hole end 2410 and a protruding end 2420 are respectively arranged at both ends in the longitudinal direction, both of which have cylindrical shapes, and a cylindrical protrusion 2421 is arranged on the protruding end 2420, wherein the hole end 2410 is rotatably connected with the movable end 1300 of the driving element 2300. The protruding end 2420 is rotatably engaged with the connecting element 2500 of the rotating rod 2600. When the motor 2100 is running, the motor 2100 drives the motor shaft 2110 to rotate, and the rotating motion is transmitted to the rotating rod 2600 through the transmission mechanism 2200. With the driving of the rotating rod 2600, the movable body 1100 rotates relative to the fixed body 1200, and the rotation angle of the movable body 1100 relative to the fixed body 1200 is less than 180 degrees.

In other embodiments (not shown), the driving component 2000 can also be provided with an anti-stuck device. When the transmission mechanism 2200 is stuck in the transmission process, the anti-stuck device can give the motor 2100 a stuck feedback, and then the motor 2100 can be reversed to be released from being stuck, so that the transmission mechanism 2200 can continue its activities.

The solution of the present invention can be applied to the following scenes (not shown). In indoor lighting design, the movable copying decoration can change the direction of light by adjusting the direction and angle of the movable body 1100, thus creating different lighting effects; in the exhibition design, the movable copying decoration can be used to display articles or artworks, and the position and direction of the movable body 1100 can be adjusted to illuminate different parts of the exhibition when necessary; in the stage lighting design, the movable copying decoration can be used on the stage, and the lighting area can be adjusted by adjusting the angle of the movable body 1100, thus creating a vivid light and shadow effect.

The solution of the present invention has the following advantages: because the movable body 1100 can rotate freely, the movable copying decoration can show a lively appearance and dynamic performance, which is more attractive than other traditional lamps; and because the direction and distribution of light can be changed by adjusting the direction and angle of the movable body 1100, various lighting effects can be created; because this kind of lamp is highly flexible, it can adapt to various environmental needs, whether indoors or outdoors; in addition, the structure of this lamp is relatively simple, and the number of parts is relatively small, therefore it is easy to manufacture and maintain.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A movable copying decoration, comprising a decoration body and at least one driving component, wherein, the decoration body comprises at least one movable body and at least one fixed body, and the movable body is rotatably engaged with the fixed body; and wherein, the movable body has a movable end, and the movable body is rotatably connected to the fixed body through the movable end; and wherein, that movable end comprises at least one movable body outer ring; the fixed body comprises at least one joint part, at least one ring frame is arranged on the joint part, and the ring frame comprises at least one joint part outer ring; and the driving component comprises at least one transmission mechanism, and the transmission mechanism comprises at least one rotating rod; one end of the rotating rod sequentially passes through the joint part outer ring and the movable body outer ring, and is configured to be used for pushing the movable body outer ring to rotate.

2. The movable copying decoration according to claim 1, wherein the driving component is arranged inside the fixed body, and the driving component further comprises at least one motor which is fixedly connected with the fixed body and comprises a motor shaft; and the transmission mechanism further comprises a driving element, a transmission rod and a connecting element.

3. The movable copying decoration according to claim 2, wherein the driving element further comprises a fixed part and a joint part, wherein the fixed part is rotationally connected with the motor shaft, and the joint part is rotatably engaged with the transmission rod; the transmission rod is rotatably engaged with the connecting element; the connecting element is fixedly connected with the rotating rod, and the rotating rod is fixedly connected with the movable body; and the movable copying decoration is configured such that, when the driving component is started, the motor shaft makes a circular rotation motion from 0 to 360 degrees, and transmits the rotation motion to the rotating rod step by step to drive the rotating rod to rotate.

4. The movable copying decoration according to claim 1, wherein the movable end further comprises a central hub and upper spokes; one end of the upper spoke is connected with the central hub, and the other end is connected with the movable body outer ring; and the upper spokes are equidistantly arranged along a circumferential direction of the central hub.

5. The movable copying decoration according to claim 4, wherein the ring frame further comprises a central hole and lower spokes; an inner end of the lower spoke is connected to the central hole, and the outer end of the lower spoke is connected to the joint part outer ring; and the lower spokes are equidistantly arranged along a circumferential direction of the central hole.

6. The movable copying decoration according to claim 5, wherein when the joint part of the movable body and the fixed body is connected, the movable end and the ring frame are arranged in parallel, the movable body outer ring and the joint part outer ring are arranged at intervals, the central hub is in contact with the central hole, and the central hub and the upper end of the rotating rod form a fixed connection.

7. The movable copying decoration according to claim 3, wherein a lower end of the rotating rod is rotatably connected with a rotating base; the inside of the rotating base is hollow, and the rotating base is fixedly connected with the fixed body, the rotating rod is provided with the connecting element, and the connecting element is fixedly connected with the rotating rod.

8. The movable copying decoration according to claim 3, wherein the driving component further comprises a fixed plate fixedly connected to the fixed body, and the fixed plate is arranged above the motor and below the transmission rod.

9. The movable copying decoration according to claim 8, wherein the motor further comprises an outer shell and an inner shell, wherein the outer shell is provided with a power supply interface, the inner shell is provided with a PCB board which is electrically connected with the power supply interface; and the inner shell is also provided with a threaded groove through which the outer shell is fixedly connected with the inner shell.

10. The movable copying decoration according to claim 9, wherein the motor is provided with a fixed disk, which is connected to the outer shell in a buckling manner; six connecting holes are equidistantly arranged on the fixed disk along a circumferential direction, and the fixed disk and the outer shell are fixedly connected through the connecting holes; and the fixed disk is also provided with at least one hole seat in the circumferential direction, and the fixed plate is provided with a through hole corresponding to the hole seat; the motor is fixedly connected with the fixed plate through the hole seat arranged on the fixed plate and the through hole arranged on the fixed plate.

11. The movable copying decoration according to claim 10, wherein the motor shaft has a hollow structure, a shape of the motor shaft is set to be cylindrical, and at least one cylindrical step is set at a position where the motor shaft is joint to the inner shell; and the motor shaft is configured to repeatedly rotate along 0 to 180 degrees.

12. The movable copying decoration according to claim 11, wherein the shapes of the joint part and the fixed part of the driving element are both cylindrical, the fixed part is sleeved on the motor shaft, and the joint part is capable of making a circular motion move around the fixed part.

13. The movable copying decoration according to claim 12, wherein the transmission rod is arranged in a strip shape, and is provided with a hole end and a protruding end, wherein the hole end is rotatably connected with the driving element, and the protruding end is detachably connected with the connecting element; the movable copying decoration is configured such that, when the motor drives the motor shaft to rotate, the transmission mechanism transmits a motion to the rotating rod, and an rotating angle of the rotating rod is less than 180 degrees.

14. A movable copying decoration, comprising a decoration body and at least one driving component, wherein, the decoration body comprises at least one movable body and at least one fixed body, and the movable body is rotatably engaged with the fixed body;

the movable body has a movable end, and the movable body is rotatably connected to the fixed body through the movable end;

the decoration body is provided with an illuminating module, which comprises a light source and a power supply, and is detachably connected to the decoration body;

the movable end comprises at least one movable body outer ring, the fixed body comprises at least one joint part, and at least one ring frame is arranged on the joint part, and the ring frame comprises at least one joint part outer ring; and the driving component comprises at least one transmission mechanism, and the transmission mechanism comprises at least one rotating rod; one end of which sequentially passes through the joint part outer ring and the movable body outer ring, and is configured to be used for pushing the movable body outer ring to rotate.

15. The movable copying decoration according to claim 14, wherein the decoration body is made of a hard material and has an appearance of an animal; the movable body has an appearance of a head, and the fixed body has an appearance of an animal trunk.

16. The movable copying decoration according to claim 15, wherein a tail, ears and antlers are mounted on the decoration body, and the tail, ears and antlers are fixedly connected with the decoration body.

17. The movable copying decoration according to claim 16, wherein the fixed body comprises a trunk part and legs, and the legs are fixedly connected to the trunk part.

18. The movable copying decoration according to claim 17, wherein the ears are made of a hard material or a flexible material, and the antlers are made of a hard material.

* * * * *